US010770240B2

(12) United States Patent
Andoralov et al.

(10) Patent No.: US 10,770,240 B2
(45) Date of Patent: Sep. 8, 2020

(54) HYBRID CAPACITOR AND METHOD OF MANUFACTURING A CAPACITOR

(71) Applicant: KEMET Electronics Corporation, Simpsonville, SC (US)

(72) Inventors: Victor Andoralov, Gränna (SE); Débora Sá, Évora (PT); Alexandre Guerreiro Fonseca, Évora (PT); Antony P. Chacko, Simpsonville, SC (US); Yaru Shi, Simpsonville, SC (US); Philip M. Lessner, Simpsonville, SC (US)

(73) Assignee: KEMET Electronics Corporation, Forth Lauderdale, FL (US)

( * ) Notice: Subject to any disclaimer, the term of this patent is extended or adjusted under 35 U.S.C. 154(b) by 131 days.

(21) Appl. No.: 16/038,609

(22) Filed: Jul. 18, 2018

(65) Prior Publication Data

US 2018/0323015 A1    Nov. 8, 2018

Related U.S. Application Data

(63) Continuation-in-part of application No. 15/909,269, filed on Mar. 1, 2018, which is a continuation-in-part
(Continued)

(51) Int. Cl.
*H01G 11/04*    (2013.01)
*H01G 11/26*    (2013.01)
(Continued)

(52) U.S. Cl.
CPC ............. *H01G 11/04* (2013.01); *H01G 11/26* (2013.01); *H01G 11/32* (2013.01); *H01G 11/48* (2013.01); *H01G 11/52* (2013.01); *H01G 11/84* (2013.01); *H01G 11/86* (2013.01); *H01G 11/58* (2013.01); *H01G 11/74* (2013.01)

(58) Field of Classification Search
CPC ........ H01G 11/04; H01G 11/26; H01G 11/48; H01G 11/86; H01G 11/52; H01G 11/84; H01G 11/32
See application file for complete search history.

(56) References Cited

U.S. PATENT DOCUMENTS 4,812,951 A    3/1989  Melody et al.
6,307,735 B1  10/2001  Saito et al.
(Continued)

FOREIGN PATENT DOCUMENTS

JP          07283086        10/1995
WO    WO 2012041506         4/2012

*Primary Examiner* — Eric W Thomas
(74) *Attorney, Agent, or Firm* — Joseph T. Guy; Patent Filing Specialist, Inc.

(57) ABSTRACT

An improved capacitor is described wherein the capacitor comprises a working element. The working element comprises a first dielectric and an anode conductive polymer layer on the first dielectric. The working element also comprises a cathode and a separator between the anode conductive polymer layer and the cathode wherein the separator comprises a separator conductive polymer layer wherein at least one of the anode conductive polymer layer or the separator conductive polymer layer is crosslinked. The working element also comprises a liquid electrolyte.

69 Claims, 17 Drawing Sheets

Related U.S. Application Data of application No. 15/095,902, filed on Apr. 11, 2016, now Pat. No. 10,068,713, application No. 16/038,609, which is a continuation-in-part of application No. 15/013,307, filed on Feb. 2, 2016, now Pat. No. 10,074,490.

(60) Provisional application No. 62/116,043, filed on Feb. 13, 2015.

(51) Int. Cl.

| | | |
|---|---|---|
| *H01G 11/48* | (2013.01) | |
| *H01G 11/86* | (2013.01) | |
| *H01G 11/52* | (2013.01) | |
| *H01G 11/84* | (2013.01) | |
| *H01G 11/32* | (2013.01) | |
| *H01G 11/58* | (2013.01) | |
| *H01G 11/74* | (2013.01) | |

(56) References Cited

U.S. PATENT DOCUMENTS

| | | | |
|---|---|---|---|
| 7,497,879 | B2 | 3/2009 | Kakuma et al. |
| 8,462,484 | B2 | 6/2013 | Kakuma et al. |
| 8,767,377 | B2 | 7/2014 | Aoyama et al. |
| 10,068,713 | B2 * | 9/2018 | Andoralov ............. H01G 11/24 |
| 10,074,490 | B2 * | 9/2018 | Chacko ................. H01G 11/56 |
| 2005/0141173 | A1 | 6/2005 | Tseng |
| 2010/0020472 | A1 | 1/2010 | Fujimoto et al. |
| 2011/0128675 | A1 | 6/2011 | Merker et al. |
| 2011/0149476 | A1 | 6/2011 | Saida et al. |
| 2013/0059064 | A1 | 3/2013 | Ryo et al. |
| 2013/0279079 | A1 | 10/2013 | Merker et al. |
| 2013/0279080 | A1 | 10/2013 | Aoyama et al. |
| 2014/0071589 | A1 | 3/2014 | Lin |
| 2014/0078646 | A1 | 3/2014 | Chacko et al. |
| 2015/0029642 | A1 | 1/2015 | Shi et al. |
| 2016/0240323 | A1 | 8/2016 | Chacko et al. |
| 2017/0294273 | A1 | 10/2017 | Andoralov et al. |

\* cited by examiner

HYBRID CAPACITOR AND METHOD OF MANUFACTURING A CAPACITOR

CROSS-REFERENCE TO RELATED APPLICATIONS

The present invention is a continuation-in-part application of pending U.S. patent application Ser. No. 15/909,269 filed Mar. 1, 2018 which is, in turn, a continuation-in-part application of pending U.S. patent application Ser. No. 15/095,902 filed Apr. 11, 2016 both of which are incorporated herein by reference. The present invention is also a continuation-in-part application of pending U.S. patent application Ser. No. 15/013,307 filed Feb. 2, 2016 which, in turn, claims priority to expired U.S. Pat. Appl. No. 62/116,043 filed Feb. 13, 2015 which is incorporated herein by reference.

BACKGROUND

The present invention is related to capacitors comprising a solid conductive polymeric electrolyte and an optional liquid electrolyte. More specifically, the present invention is related to a capacitor comprising a conductive separator and a method of forming the hybrid capacitor with improved conductive polymer coverage within the interstitial portions of a wound structure wherein at least one of the conductive polymer layers is cross-linked within the layer, to an adjacent surface or to an adjacent conductive polymer layer.

Capacitors have historically been defined within two general types with one type utilizing a liquid electrolyte and the other type utilizing a solid electrolyte. Liquid electrolyte capacitors, generally, comprise a layered structure typically as a winding with an anode conductor, a cathode conductor and an interleaved separator immersed in a liquid electrolyte all sealed, preferably hermetically, within a container. Solid electrolyte capacitors, generally, include a conductive monolith or foil with a dielectric layer thereon and a solid cathode, such as conductive polymer or manganese dioxide, on the dielectric. Both general types of capacitor have experienced wide spread use in commerce and each has advantages, and disadvantages, not common to the other. For example, liquid electrolytic capacitors have a high capacitance but a poor Equivalent Series Resistance (ESR) due to poor conductivity of the liquid electrolyte, typically not above about 0.015 S/cm, whereas conductive polymers have a high conductivity, up to 600 S/cm, and therefore capacitors utilizing conductive polymeric cathodes have a much lower ESR.

Conductive polymeric cathodes have seen wide spread use in commerce due, at least in part, to their low equivalent series resistance (ESR) and non-destructive failure mode. This has lead to a desire to form a hybrid capacitor wherein the conductive polymers commonly employed for solid electrolytic capacitors are utilized within the windings of a liquid electrolyte structure with the goal of achieving the high voltage common with liquid electrolyte capacitors while maintaining the lower ESR common with solid conductive polymeric electrolytes. U.S. Pat. Nos. 8,462,484 and 8,767,377 teach exemplary hybrid capacitors.

The formation of a hybrid capacitor has typically involved the formation of the interleaved wound structure; comprising anode, cathode and separator; followed by impregnation with the conductive polymer. The impregnation has been done by either in-situ polymerization of monomers or by diffusion of pre-formed polymer slurry into the interstitial areas of the wound interleaved structure.

In-situ polymerization of a monomer in the presence of an oxidizer was used to manufacture a first generation of hybrid capacitors. In-situ polymerization is a complex method with many problems including contamination of the final product by monomer and oxidizer and the work environment conditions are complex leading to poor process reliability. These issues were mitigated by the use of water based dispersions, or slurries, of pre-formed conductive polymer to impregnate the interstitial spaces of the capacitor winding.

Impregnation of a winding with preformed conductive polymer involves dipping the working element into a solution comprising conductive polymer or adding the solution onto the working element wherein the conductive polymer migrates, or diffuses, into the interstitial spaces. Manufacturing stages are complicated due to limitations associated with the rate and efficiency of diffusion through the working element. Filtration of polymeric particles and counterions by the separator limits effective diffusion thereby limiting the length of the working element. As a result, only small capacitor sizes have been successfully achieved. Large capacitors have proven difficult to make. In fact, the maximum case size widely available commercially is about 10 mm in diameter and about 12.5 mm in length with a maximum capacitance of about 22 µF (at rated voltage 63V) and the lowest ESR achieved is about 16 ma.

Due to manufacturing limitations, hybrid capacitors have been primarily radial capacitors as the manufacturing process is not suitable for small axial capacitors. With axial capacitors the bottom tab, or lead, will necessarily be dipped in the polymer precursor or polymer slurry thereby resulting in a polymer coated tab which causes problems with subsequent processing. Furthermore, it is virtually impossible to apply voltage across the capacitor, such as to form polymer in-situ or to heal damaged sites, since the bottom tab will be in the solution.

Improvements have been made in hybrid capacitors wherein the polymeric coating is formed prior to wrapping. This has advanced the art of hybrid capacitors utilizing conductive polymer and liquid electrolyte. Unfortunately, the hybrid capacitors formed by coating a conductive polymer layer on the anode, separator or cathode prior to winding have not achieved the expected advantages which is now understood to be due to separation or delamination of the conductive polymer and the formation of electronic barrier layers between adjacent conductive polymer layers.

The present invention provides for an improvement in hybrid capacitors by cross-linking conductive polymer layers with crosslinking being within a conductive polymer layer, between adjacent layers of conductive polymer or between a conductive polymer layer and a structural element such as the anode, separator or cathode.

SUMMARY OF THE INVENTION

It is an object of the invention to provide an improved method for forming a hybrid capacitor and an improved capacitor formed by the method.

A particular feature of the invention is the ability to provide a hybrid capacitor without limit to capacitor size, configuration or shape.

These and other advantages, as will be realized, are provided in a capacitor comprising a working element. The working element comprises a first dielectric and an anode conductive polymer layer on the first dielectric. The working element also comprises a cathode and a separator between the anode conductive polymer layer and the cathode wherein the separator comprises a separator conductive polymer layer wherein at least one of the anode conductive polymer layer or the separator conductive polymer layer is cross-linked. The working element also comprises a liquid electrolyte.

Yet another embodiment is provided in a method for forming a capacitor. The method comprises:
forming a working element comprising:
forming an anode comprising a first dielectric and an anode conductive polymer layer on the first dielectric;
forming a cathode;
forming a separator wherein the separator comprises a separator conductive polymer layer;
forming a layered structure comprising the anode, the cathode and the separator wherein the separator is between the anode and cathode;
forming a winding of the layered structure;
impregnating the winding with a liquid electrolyte; and
wherein at least one of the anode conductive polymer layer or the separator conductive polymer layer is crosslinked.

FIGURES

Figure 14:
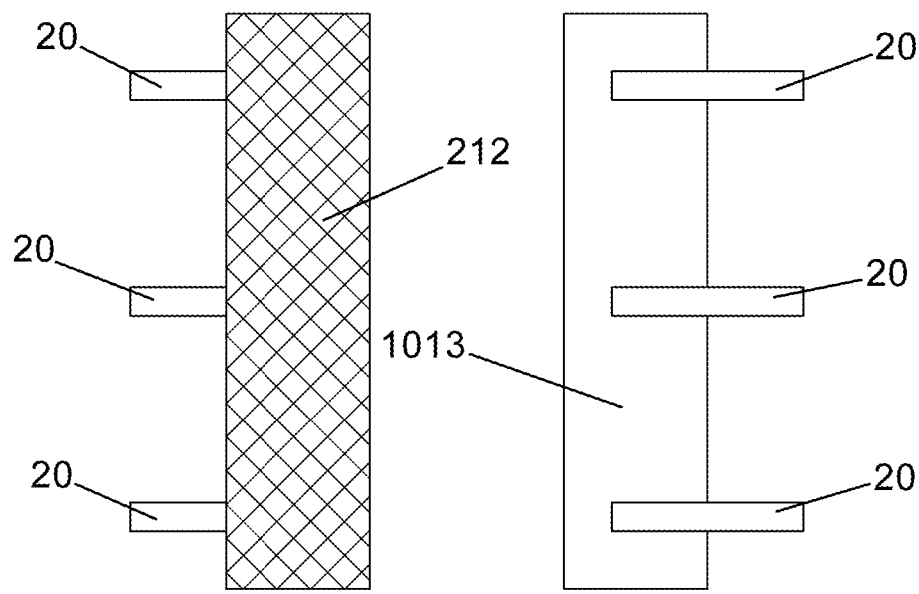
Figure 15:
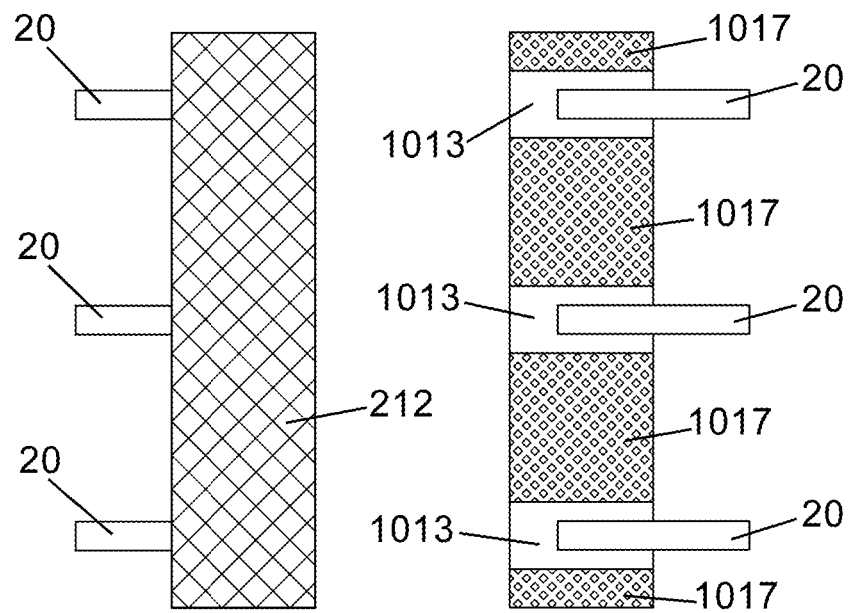

FIGS. 14 and 15 schematically illustrate opposite sides of an asymmetrical anode of the invention.

Figure 16:
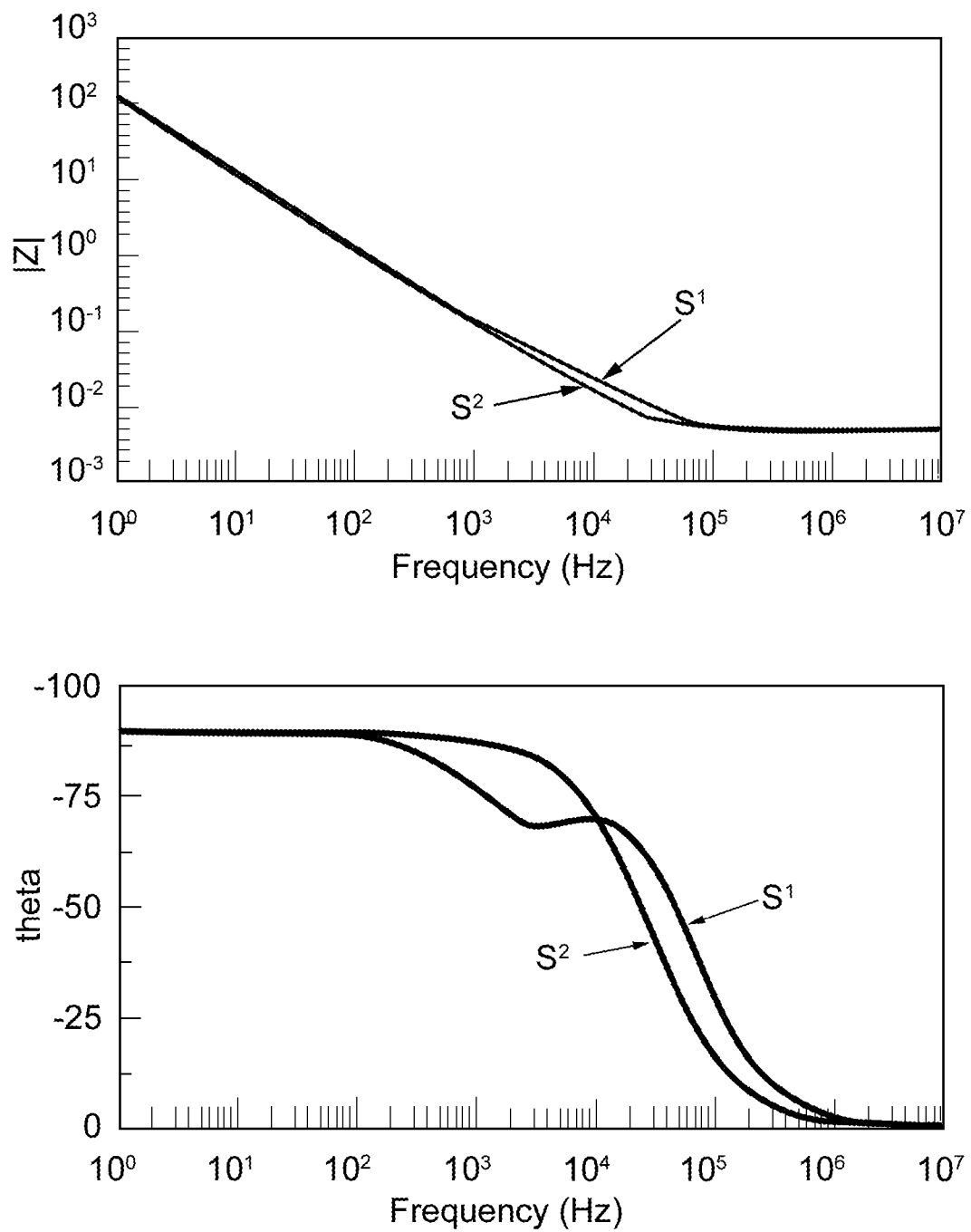
Figure 17:
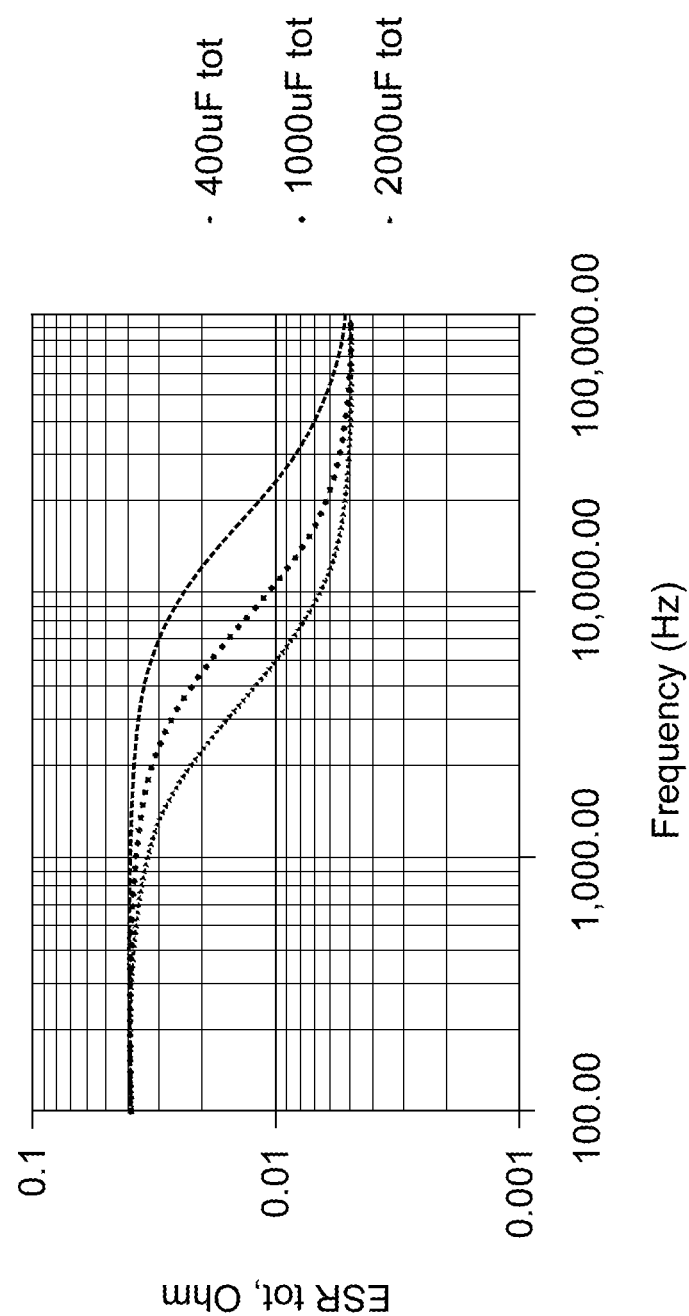
Figure 18:
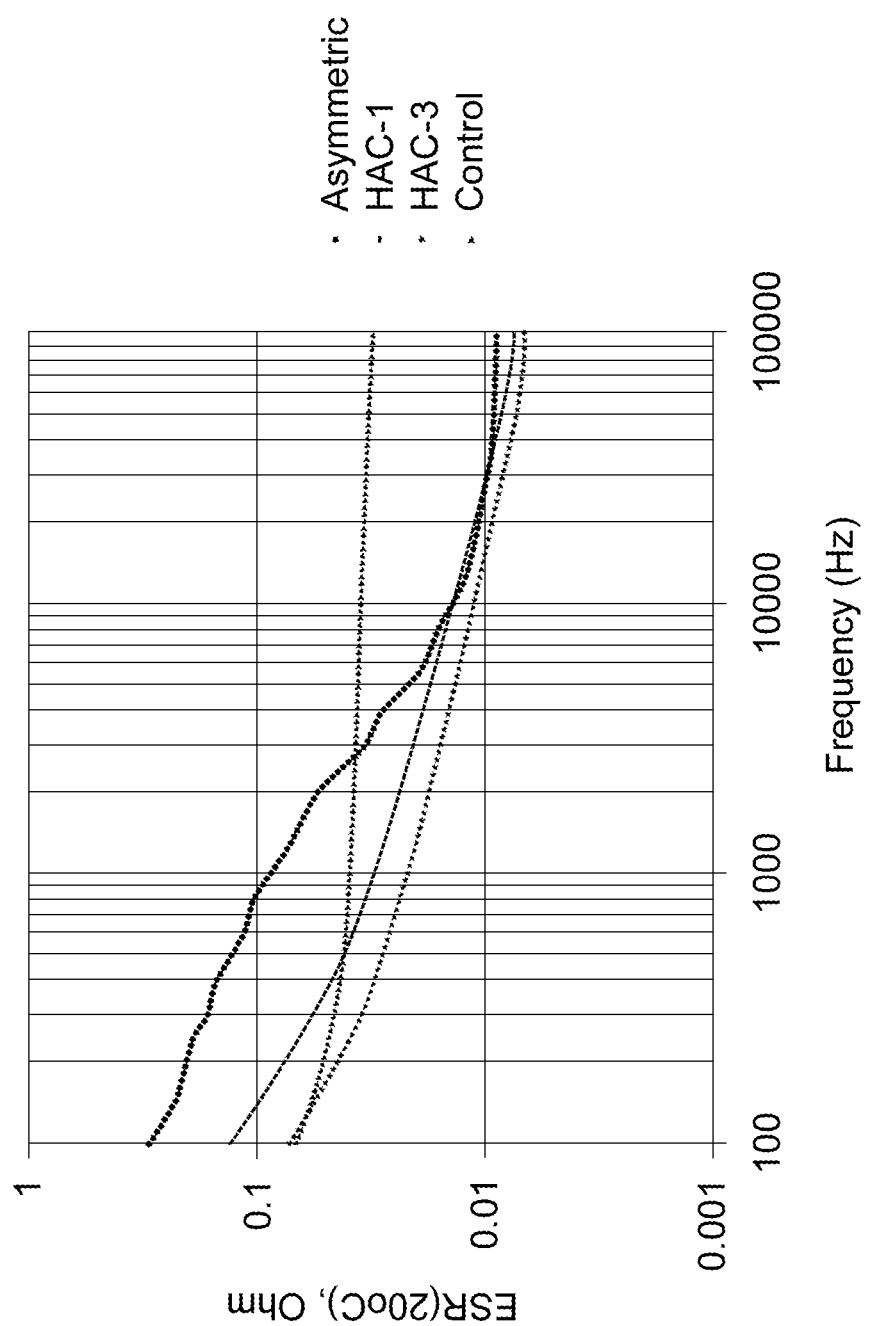

FIGS. 16-18 graphically illustrate electrical performance.

Figure 19:
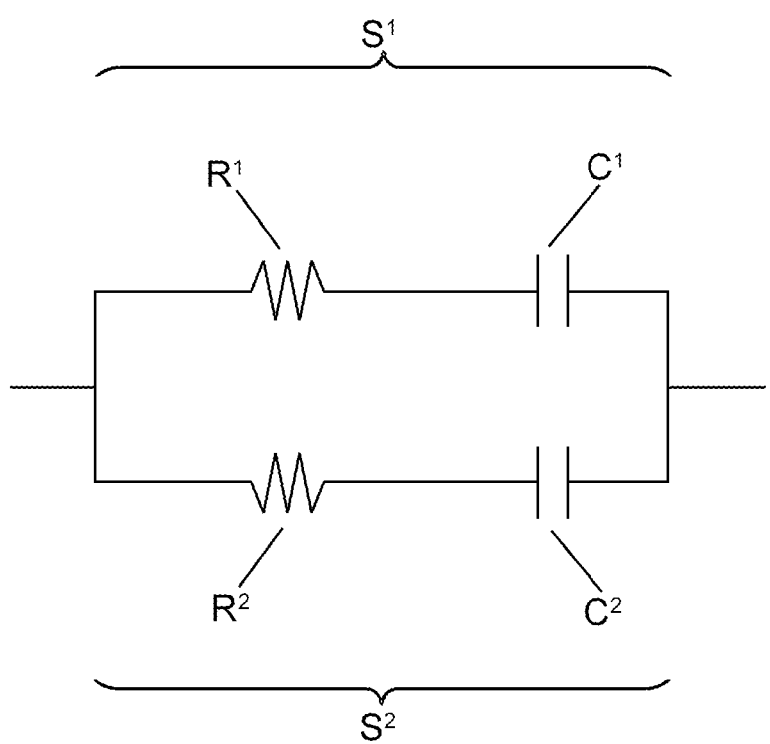

FIG. 19 is an electrical schematic diagram of an embodiment of the invention.

Figure 20:
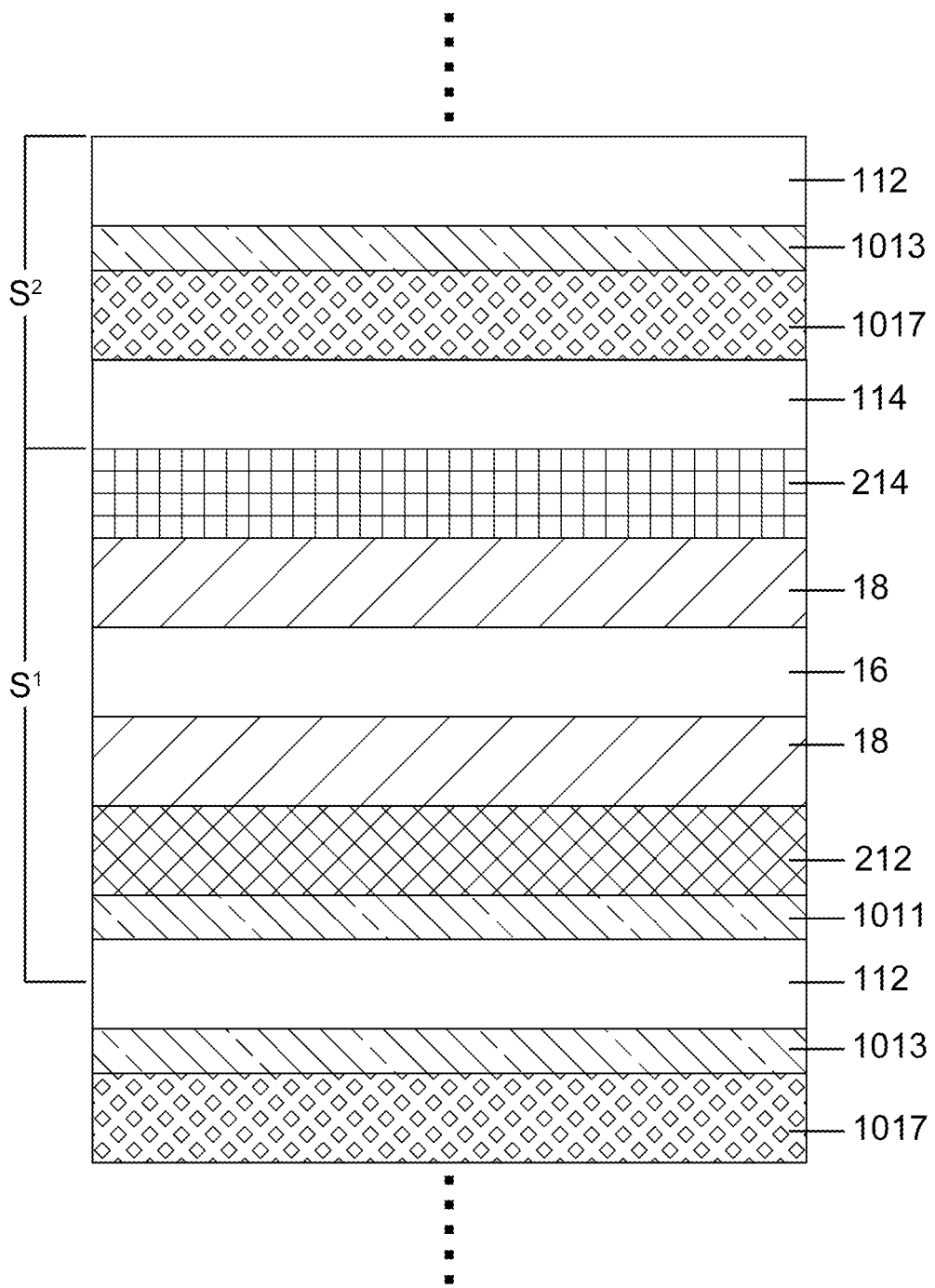

FIG. 20 is a schematic cross-sectional view of an embodiment of the invention.

Figure 21:
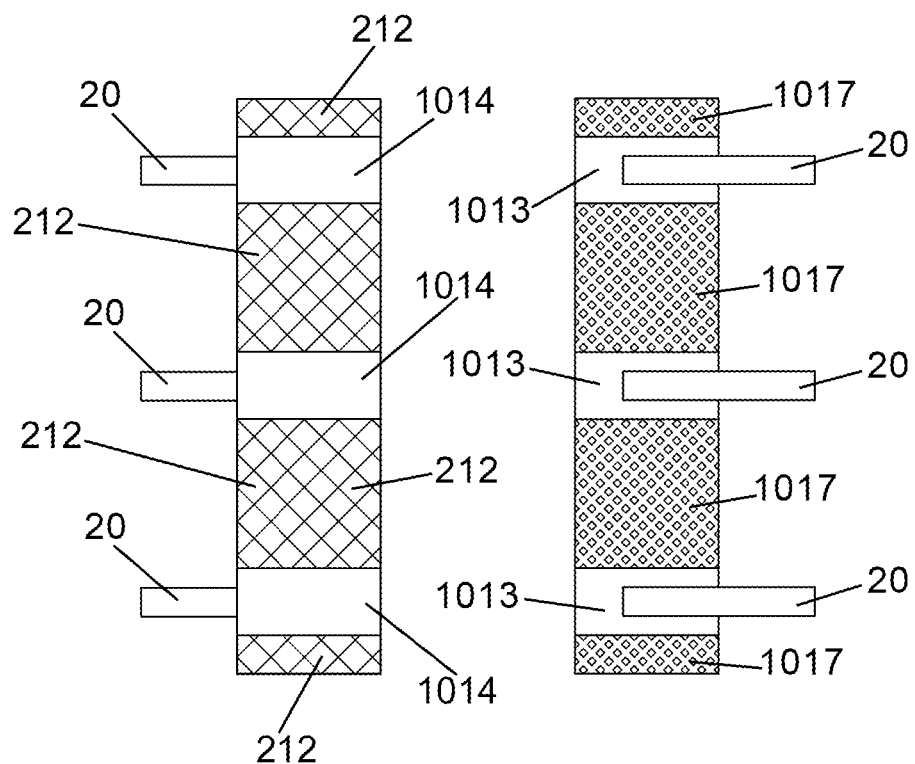

FIG. 21 is a schematic illustration of an embodiment of the invention.

Figure 22:
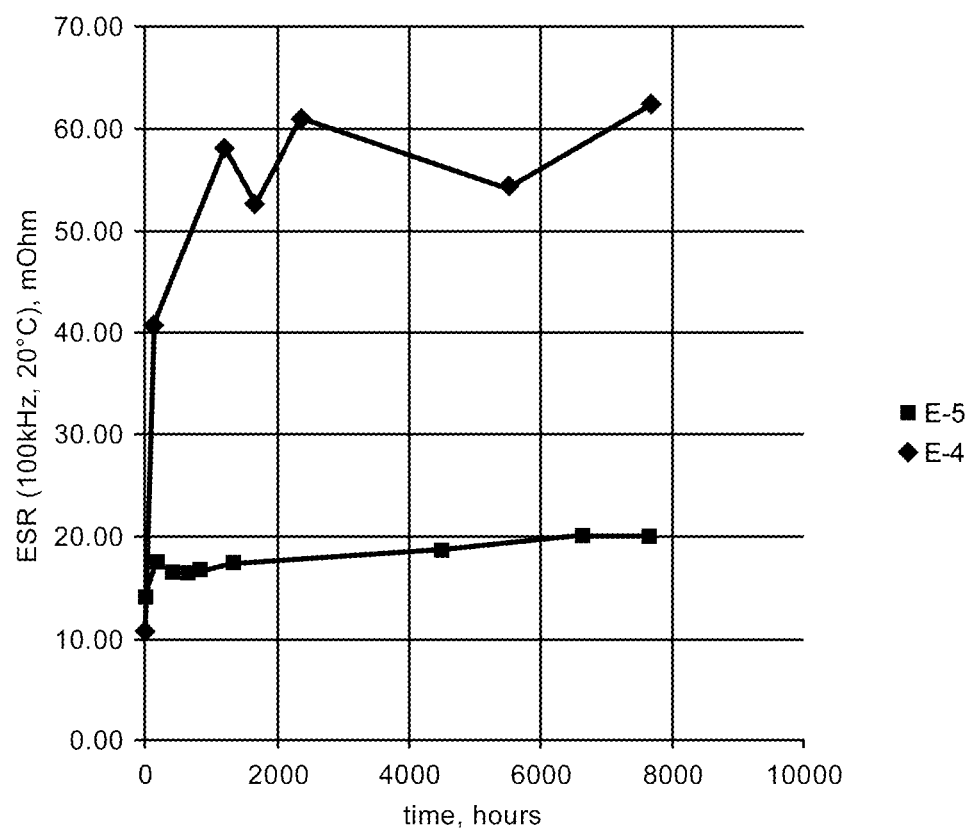

FIG. 22 is a graphical representation of the advantages of an embodiment of the invention.

DESCRIPTION

The instant invention is specific to a capacitor, comprising a solid conductive polymer electrolyte and an optional, but preferred, liquid electrolyte interspersed in a wound capacitor comprising interleaved anode, cathode and a separator. More specifically, the present invention is directed to a capacitor, and a method of making a capacitor, which is not limited in size, exhibits improved quality and is suitable for manufacturing axial capacitors. More specifically, the instant invention allows for the manufacture of capacitors with enhanced performance, specifically low ESR and high capacitance, without limit to case size and in virtually any design including axial, radial, planar, etc. Even more specifically, the present invention provides for a hybrid capacitor wherein conductive polymer layers are cross-linked with crosslinking being within a conductive polymer layer, between adjacent layers or between the conductive polymer layer and a structural element such as the anode, separator or cathode.

An element of the instant invention is the utilization of anodes, cathodes and separators which are pre-treated with conductive polymer either as a coating or, particularly in the case of the separator, being impregnated with conductive polymer. The pre-treatment with conductive polymer is done before the working element is formed thereby allowing for an improved polymer layer relative to the prior art. Since the method is not limited to polymer diffusion into the windings the instant method eliminates capacitor size restrictions and significantly increases volumetric efficiency defined as capacitance as a function of capacitor size. In a particularly preferred embodiment the conductive polymer layers are crosslinked either prior to winding, after winding or some combination thereof by incorporating a crosslinker preferably prior to winding.

The problem associated with solid electrolyte distribution over the entire electrode surface is eliminated by the formation of a conductive porous layer prior to winding thereby providing a conductor between the anode conductive polymer coating and cathode conductive polymer coating whereby conventional liquid electrolyte can flow through the conductive porous layer to provide typical functions thereof such as self-healing. As the conductive polymeric layers are formed prior to winding the winding is impregnated with the liquid electrolyte after winding. The liquid electrolyte is more mobile and can more easily diffuse, or migrate, into the interstitial area. The winding can be impregnated with a crosslinker after winding in some embodiments. This allows for a wide variety of designs since the liquid electrolyte is not impeded from migrating into even the most remote interstitial spaces. Furthermore, the prior problem of conductivity break, essentially an incomplete electrical conductive pathway, between polymer coated electrodes is mitigated by substituting the typical non-conductive separator with a conductive porous layer between the anode conductive polymer coating and cathode conductive polymer coating.

The durability of hybrid capacitors is further improved herein by enhancing the film integrity thereby improving the interaction of liquid electrolyte with the solid electrolyte by forming intermolecular bonds between reactive groups of the solid electrolyte and reactive groups of the liquid electrolyte. The intermolecular bonds can be formed by in-situ reaction of the solid electrolyte reactive groups and the liquid electrolyte reactive groups. An intermolecular bond is either an ionic bond or a covalent bond and preferably a covalent bond.

The invention will be described with reference to the various figures forming an integral non-limiting component of the disclosure. Throughout the disclosure similar elements will be numbered accordingly.

Figure 1:
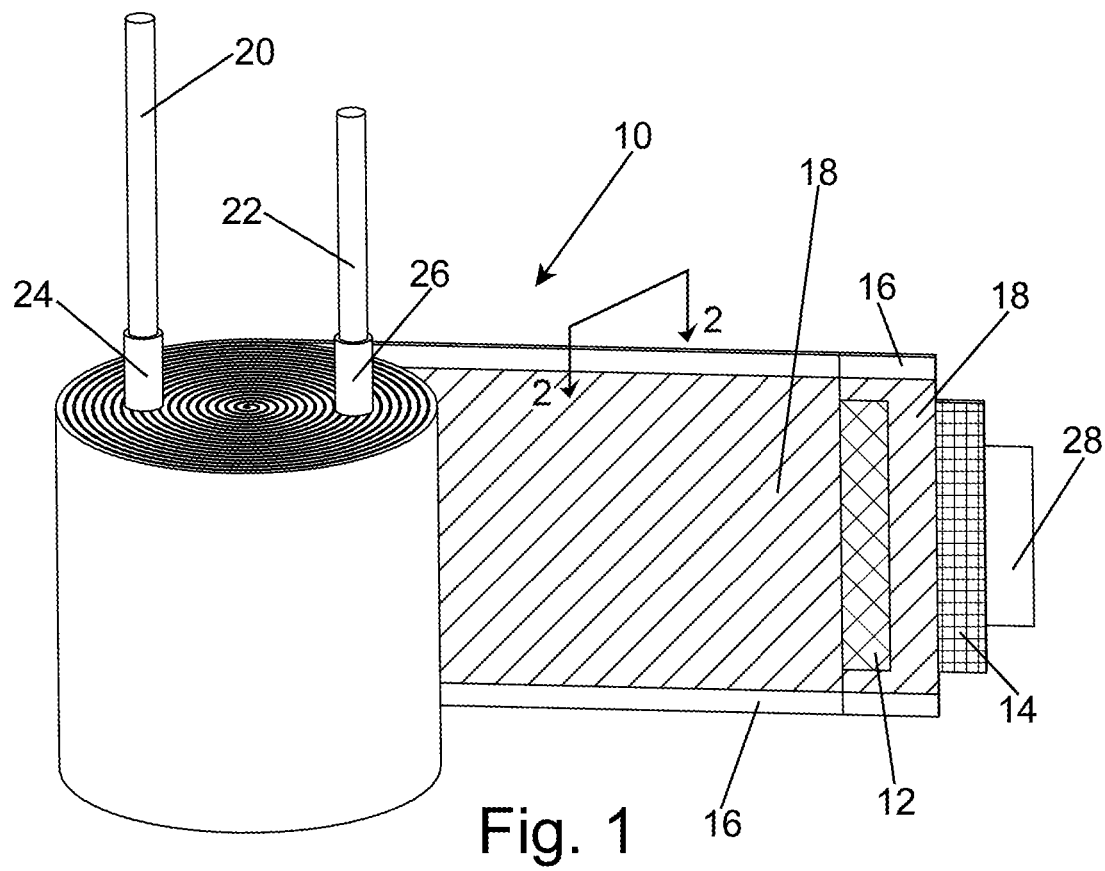
FIG. 1 is a partially unwound schematic perspective view of an embodiment of the invention.

An embodiment of the invention will be described with reference to FIG. 1 wherein a working element is shown in schematic partially unwound view prior to insertion into a container and impregnation with liquid electrolyte. In FIG. 1, the working element, generally represented at 10, comprises a conductive coated anode, 12, comprising conductive polymer on at least a portion of one side, and conductive coated cathode, 14, with a conductive separator, 16, there between. The conductive separator has conductive polymer, 18, either coated on the separator or the separator is impregnated, and preferably saturated, with conductive polymer.

The conductive coated anode, 12, and conductive coated cathode, 14, each have conductive polymer layers there on as will be more full described herein. An anode lead, 20, and cathode lead, 22, extend from the wound capacitor and ultimately form the electrical connectivity to a circuit. It would be understood from the description that the anode lead is in electrical contact with the anode and the cathode lead is in electrical contact with the cathode and electrically isolated from the anode or anode lead. Tabs, 24 and 26, are commonly employed to electrically connect the anode lead to the anode and the cathode lead to the cathode as known in the art. A closure, 28, such as an adhesive tape inhibits the working element from unwinding during handling and assembly after which the closure has little duty even though it is part of the finished capacitor.

Figure 2:
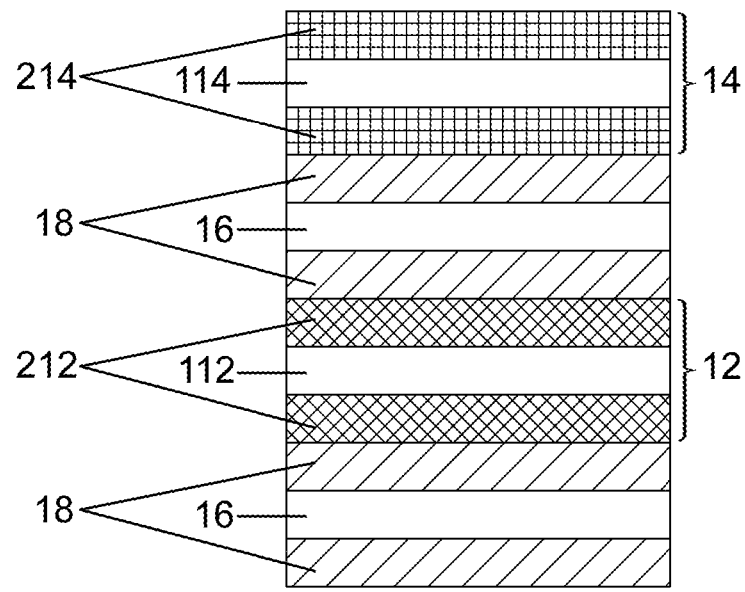
FIG. 2 is a cross-sectional view taken along line 2-2 of FIG. 1.

A cross-sectional view, taken along line 2-2 of FIG. 1, is illustrated schematically in FIG. 2. In FIG. 2, the separator, 16, is shown with conductive polymer, 18, on either side thereof for the purposes of illustration with the understanding that the separator may be impregnated, and preferably saturated, with conductive polymer such that the dimension of the separator is not appreciably altered by the inclusion of conductive polymer. The conductive polymer layer, 18, is preferably crosslinked and in a particularly preferred embodiment the conductive polymer layer, 18, is crosslinked to the separator, 16. The conductive coated anode, 12, illustrated as a symmetrical anode comprises an anode foil, 112, with an anode conductive layer, 212, on each side thereof when the preferred conductive layer is a conductive polymer layer. The conductive polymer layer, 212, is preferably crosslinked and in a particularly preferred embodiment the conductive polymer layer, 212, is crosslinked to adjacent conductive polymer layer, 18. The conductive coated cathode, 14, comprises a cathode foil, 114, with a conductive layer, 214, on at least one side thereof. The conductive layer, 214, on the cathode is preferably a conductive polymer layer which is preferable crosslinked and more preferably crosslinked to an adjacent conductive polymer layer, 18. Alternatively, the conductive layer, 214, on the cathode is a carbon layer. The separator is preferably porous thereby allowing liquid electrolyte to pass there through. Once the working element is formed and inserted into a housing the liquid electrolyte fills any void or vacancy between the anodes conductive polymer layer, 212, and the cathodes conductive polymer layer, 214.

While the cathode is illustrated herein as having a conductive polymer coating the invention is not limited thereto. The cathode layer can comprise a conductive carbon layer or a metallic layer and in some embodiments it is preferred that the cathode not comprise a conductive polymer layer. In a preferred embodiment the cathode layer and anode layer are the same for manufacturing conveniences.

Figure 3:
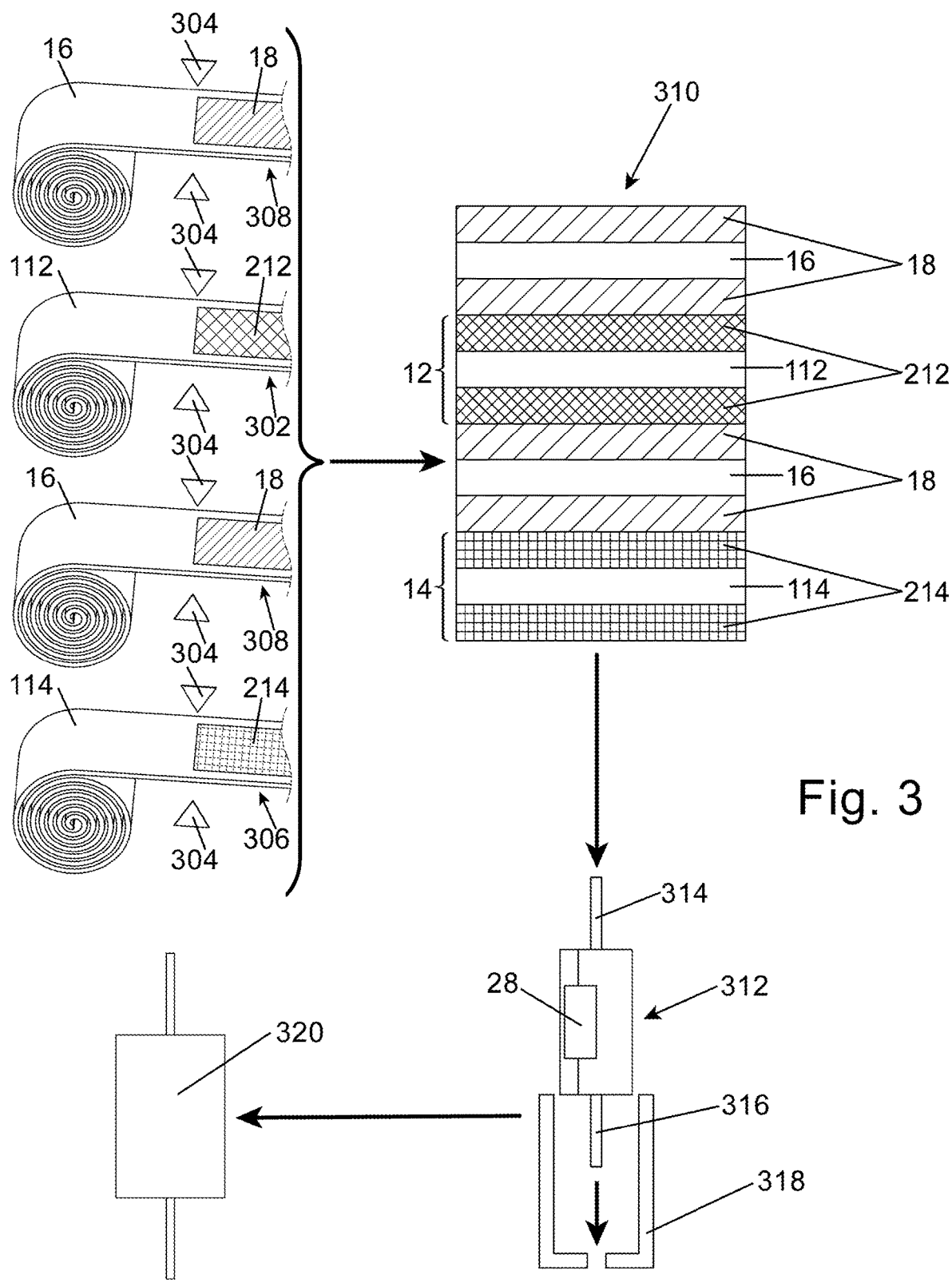
FIG. 3 is a schematic representation of an embodiment of the invention.

An embodiment of the invention will be described with reference to FIG. 3. In FIG. 3, a series of layers are prepared including an anode layer, at 302, wherein an anode foil, 112, is treated to form a dielectric on the surface of the anode foil and then preferably a conductive polymer layer, 212, is formed on the dielectric on at least a portion of one side by a conductive polymer application process, 304. The conductive polymer application process occurs on the dielectric on at least a portion of one side of the anode foil and for a symmetrical anode on both sides of the anode foil, in simultaneous or sequential coating steps. The conductive polymer layer, 212, on the anode may be crosslinked during the application process or a crosslinker may be in included which later crosslinks with the conductive polymer layer, 212, or with an adjacent layer after winding. If a cathode comprising a conductive polymer layer is employed the cathode layer is formed, at 306, wherein a conductive polymer layer, 214, is formed on the cathode, 114, by a conductive polymer application process, 304, which may be the same process as used for the anode conductive polymer layer or a different process. The conductive polymer layer, 214, on the cathode may be crosslinked during the application process or a crosslinker may be in included which later crosslinks the conductive polymer layer, 214, or with an adjacent layer after winding. If a cathode layer is used which does not comprise a conductive polymer an appropriate roll of material is provided and the polymer formation process for the cathode layer is not necessary. A separator layer is formed, at 306, wherein an impregnated area of conductive polymer, 18, is formed by a conductive polymer application process, 304, which may be the same process as the anode and cathode layer formation or a different process. The conductive polymer layer, 18, on the separator may be crosslinked during the application process or a crosslinker may be included which later crosslinks with the conductive polymer layer, 18, or with an adjacent layer after winding. A layered structure, 310, as described relative to FIG. 2, is formed by interleaving the layers. The layered structure is slit, an anode tab, 314, is electrically connected to the anode and a cathode tab, 316, is electrically connected to the cathode resulting in a tabbed working element, 312, preferably with a closure, 28, securing the working element to inhibit unwinding. Leads, not shown, are preferably attached to the tab, or the tab functions as a lead, or electrically connects to a component of a housing such as a conductive, preferably metallic, can or conductive, preferably metallic, lid which functions as a lead, thereby providing a leaded working element. For the purposes of this illustration an axial arrangement is illustrated without limit thereto. The leaded working element is placed in a housing, 318, thereby forming a housed leaded working element. The housed leaded working element is optionally impregnated with liquid electrolyte which is preferably a liquid at operating temperatures. The liquid electrolyte is also referred to in the art as an impregnating electrolyte. The housed leaded working element is optionally impregnated with crosslinker to crosslink conductive polymer layers or to crosslink adjacent conductive polymer layers to each other. The housing is sealed and the capacitor is aged to provide a finished capacitor, 320.

Figure 12:
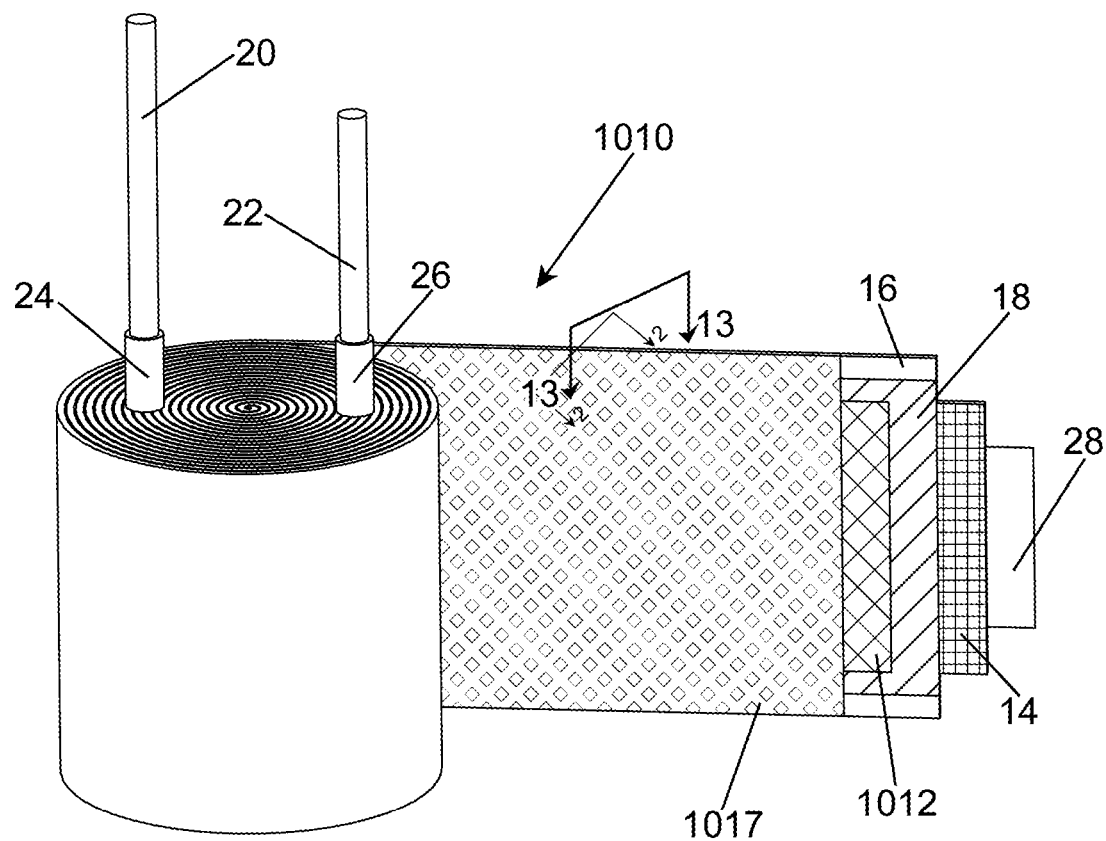
FIG. 12 is a partially unwound schematic perspective view of an embodiment of the invention.
Figure 13:
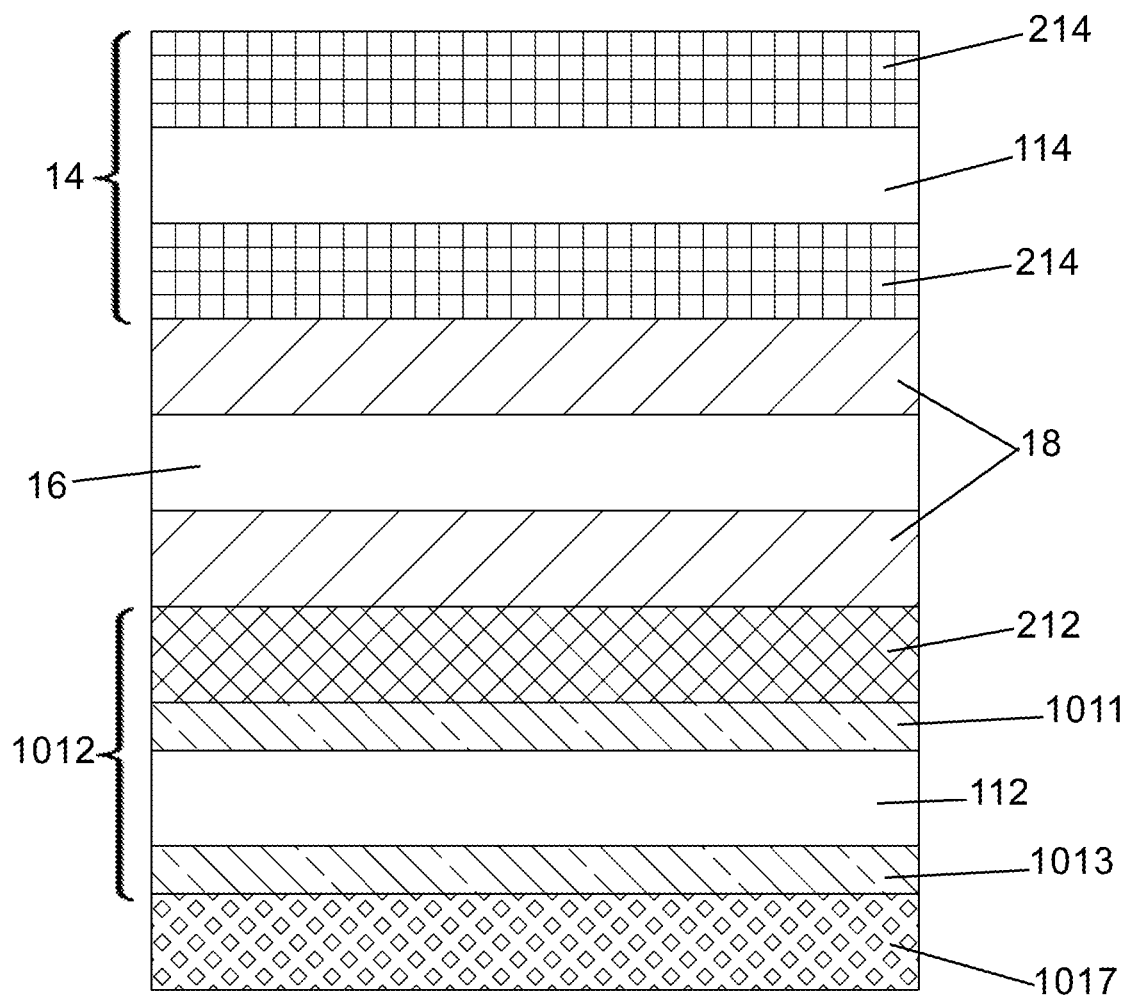
FIG. 13 is a cross-sectional view taken along line 13-13 of FIG. 12.

An embodiment of the invention will be described with reference to FIGS. 12 and 13. In FIG. 12 a working element is shown in schematic partial unwound view and in FIG. 13 a schematic cross-section is shown as taken alone line 13-13 in FIG. 12. The working element, generally represented at 1010, comprises an asymmetrical anode layer, 1012, wherein the anode layer comprises a first dielectric, 1011, on a first side and a second dielectric, 1013, on a second side. The first and second dielectric are preferably the same in some embodiments, for manufacturing conveniences, however, the first and second dielectric can be different to obtain different properties. The first dielectric is coated, and at least partially covered, with conductive polymer, 212, which is optionally crosslinked and optionally crosslinked to an adjacent conductive polymer layer. The conductive cathode layer, 14, and conductive separator can be as described with reference to FIG. 1. A non-conductive separator, 1017, is between the second dielectric and adjacent cathode layer. The non-conductive separator may be void of any conductive polymer thereon or therein. In an embodiment a conductive separator as described elsewhere herein can be utilized adjacent the second dielectric thereby minimizing the number of components necessary in the manufacturing process, however, this is not a preferred embodiment due to cost considerations.

An embodiment of an asymmetrical anode layer, 1012, is illustrated in schematic view in FIG. 14 wherein the entire second dielectric, which is preferably on the same side as the attachment of the anode lead, 20, is exposed without conductive polymer layer thereon. In a preferred embodiment the asymmetrical anode layer forms, on one side, a capacitive couple comprising conductive polymer between the dielectric of the anode and the cathode layer. The opposite side, comprising the second dielectric which does not comprise polymer, has liquid electrolyte and a non-conductive separator between the second dielectric and cathode thereby forming a conventional capacitive couple utilizing a liquid electrolyte thereby forming a capacitor comprising parallel functionality.

For the purposes of the present invention an asymmetrical anode is defined as an anode having less of the surface area on one side coated by conductive polymer than the amount of surface area on the opposite side coated by conductive polymer.

An embodiment of an asymmetrical capacitor comprising an asymmetrical anode is illustrated schematically in FIG. 20. In FIG. 20, an anode, 112, is illustrated schematically comprising a first dielectric, 1011 and second dielectric, 1013. The first dielectric has coated thereon a layer of conductive polymer, 212. A conductive separator, 16, comprising conductive polymer, 18, as detailed herein is adjacent the conductive polymer layer, 212. A cathode layer, 114, with an optional first layer of conductive polymer, 214, is adjacent the conductive separator thereby forming a first circuit, $S^1$, having a first resistance and first capacitance. The second dielectric, 1013, of the anode is separated from the cathode by a non-conductive insulator, 1017, thereby forming a second circuit, $S^2$, having a second resistant and second capacitance. The capacitor illustrated in FIG. 20 would have an electrical schematic diagram is illustrated in FIG. 19 wherein the resistance and capacitance of the first capacitive couple, comprising a conductive polymer there between, illustrated as $S^1$, has a first resistance, $R^1$, and a first capacitance, $C^1$. The second capacitive couple, with no conductive polymer there between, illustrated as $S^2$, has a second resistance, $R^2$, and a second capacitance, $C^2$. In FIG. 20 at least one conductive polymer layer is crosslinked and preferably with an adjacent conductive polymer layer. In a preferred embodiment of FIG. 20 the conductive polymer, 18, on the separator, 16, is crosslinked to the separator.

A hybrid capacitor with a symmetrical anode has single capacitance with each capacitive couple having an anode and cathode with the combination of a conductive polymer and liquid dielectric there between. With an asymmetrical anode, as illustrated in FIG. 20, the total capacitance of the capacitor is represented by two parallel capacitive couples with one being the same capacitive couple as the symmetrical anode and the other being the capacitive couple formed by an anode, cathode and a non-conductive separator impregnated with a liquid electrolyte, without a full layer, and preferably no layer, of conductive polymer there between. Each capacitive couple, with the asymmetrical anode, has two ESR's with one being the ESR for the capacitive couple having the conductive polymer between the anode and cathode, referred to herein as the polymeric capacitive couple, and the other having less than a complete layer of, or no, conductive polymer between the anode and cathode referred to as the electrolytic capacitive couple.

FIG. 16 illustrates graphically the impedance |Z| of the polymeric capacitive couple, $S^2$, without crosslinking versus the electrolytic capacitive couple, $S^1$, as a function of frequency (Hz) wherein the polymeric capacitive couple has an ESR of about 5 mOhm and the electrolytic capacitive couple, with no conductive polymer layer on the second dielectric, has an ESR of 150 mOhm with both having a total capacitance of about 1000 μF.

FIG. 17 illustrates graphically the frequency dependency of fully asymmetrical capacitor, as illustrated in FIG. 20, with an ESR for an un-crosslinked polymeric capacitive couple of about 5 mOhm and an ESR for the electrolytic capacitive couple of about 150 mOhm wherein the capacitor is formulated to a capacitance of 400 μF, 1000 μF and 2000 μF. If capacitance is significant the ESR shift occurs at lower frequencies. For high frequency applications the capacitor can demonstrate enhanced ripple current capability.

FIG. 15 schematically represents a partially asymmetric anode layer, at least that portion of the second dielectric in the vicinity of the anode lead is exposed without conductive polymer layer thereon. At least a portion of the second dielectric is not coated by conductive polymer and preferably at least 25% to no more than 99% of the area of the second dielectric is covered. That portion which is not covered in conductive polymer is preferably devoted to an area of attachment for the tabs. In FIG. 21 both the first dielectric and second dielectric are incompletely covered by conductive polymer. At least 25% to no more than 99% of the area of each dielectric is covered. That portion which is not covered in conductive polymer is preferably dedicated to an area of attachment for the tabs and this area is often degraded on both sides by tab attachment.

The cathode foil, separators and anode foil are typically provided as a wide roll and slit to size. The anode foil is preferably etched and a dielectric is formed thereon. The dielectric may be formed prior to slitting in which case a subsequent step is desirable to form dielectric on the slit edge prior to application of the conductive polymer coating. The cathode, separator and anode may be treated with a coupling agent, to improve adhesion between the surface and conductive polymer layer, or to impart other specific surface behaviors. The cathode, separator and anode may be washed and dried before or after conductive polymer layer formation or impregnation and the conductive polymer layer formation or impregnation step may be repeated several times if required. Electrical leads, or tabs, are typically electrically connected to the anode and cathode, preferably prior to cutting to length and the leads may be treated with masking material to protect them from farther modification and to keep them ready for welding to capacitor terminals.

The conductive polymer may be applied to the cathode, anode or separator by any suitable method including immersion, coating, and spraying. In immersion the cathode, anode or separator is pulled through a bath or vessel with a conductive polymer dispersion therein wherein the dispersion preferably comprises at least about 1 wt % conductive polymer to no more than about 10 wt % conductive polymer. Immersion is preferred for the separator. Coating and spraying may be done with any printing technique including screen printing or spraying of a dispersion of conductive polymer onto the surface of cathode foil, anode foil, or separator. Coating or spraying is preferable for the cathode and anode. It is preferable that the conductive polymer coating be applied to the anode, cathode or separator at an amount of at least 0.1 mg/cm$^2$. Below about 0.1 mg/cm$^2$ the coating weight is insufficient for adequate conduction and incomplete coating may result. It is preferable that the conductive polymer coating be applied in an amount sufficient to achieve a coating weight of no more than about 10 mg/cm$^2$. Above about 10 mg/cm$^2$ the added coating thickness does not appreciably increase the conductivity.

Figure 4:
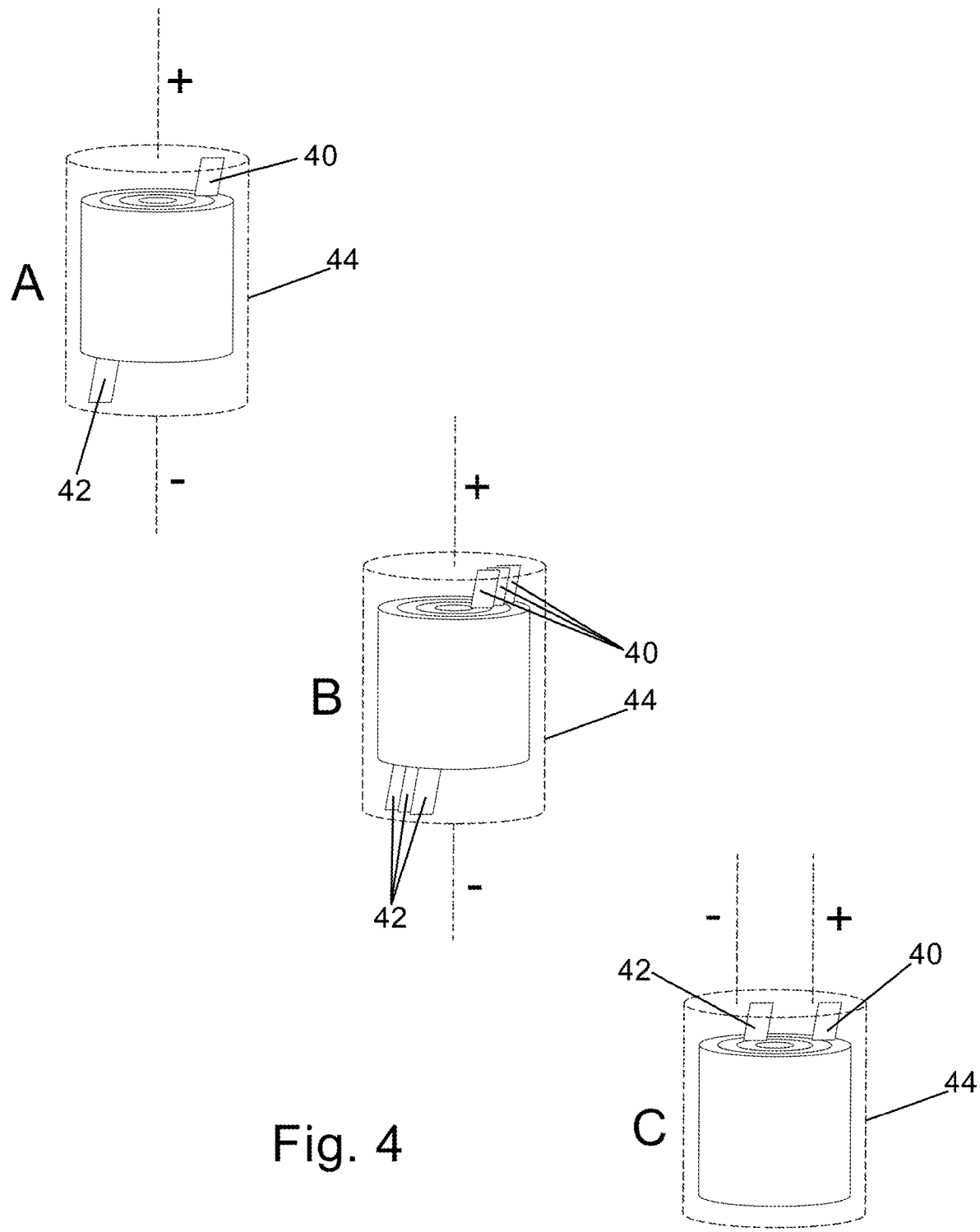
FIG. 4 is a schematic representation of an embodiment of the invention.

An axial capacitor is a particularly preferred embodiment. An axial capacitor has an anode terminal on one face of the capacitor and a cathode terminal on the opposite face. Wound axial capacitors, incorporating conductive polymer electrolytes, have been considered unavailable due to the issues related with polymer impregnation wherein the lower tab or lead is necessarily immersed in the conductive polymer, or precursors, leading to detrimental deposition of conductive polymer thereon. A particular advantage with axial capacitors is the ability to utilize multiple tabs and leads particularly as the length of the anode and cathode increase as is now available with the instant invention. Longer foil lengths lead to a higher percentage of foil resistance culminating in a higher ESR. Multi-tab or multi-leads minimizes the foil resistance effect. With a single lead the current must flow from the furthest extent of the foil to the tab and lead which is detrimental to ESR. It is preferable to utilize multiple anode leads and multiple cathode leads thereby decreasing the conductive path length. Various capacitor configurations will be described with reference to FIG. 4 wherein the capacitors are illustrated schematically in partial shadow view thereby allowing the components to be visualized. In FIG. 4, a single tab axial capacitor is illustrated at A, a multiple tab axial capacitor is illustrated at B and a radial capacitor is illustrated at C. An axial capacitor has anode leads, 40, and cathode leads, 42, extending from opposing sides of the working element, 44, whereas a radial capacitor has anode leads and cathode leads extending from a common side. FIG. 4B illustrates multiple anode tabs, 40, and multiple cathode tabs, 42, extending from the working element wherein each tab is in electrical contact with the anode at a different location. For example, FIG. 4B is illustrated with three tabs, without limit thereto, wherein the tabs are preferably equally spaced along the length of the anode thereby minimizing the length of the conduction path. Similarly, FIG. 4B is illustrated with three cathode leads which are preferably equally spaced along the length of the cathode. Multiple leads are possible with radial capacitors but it has previously been unsuitable for use with hybrid capacitors since the limitation of a small size made the use of multiple leads on a common face difficult to manufacture. Even with a large size single leads are preferable with radial capacitors.

Figure 11:
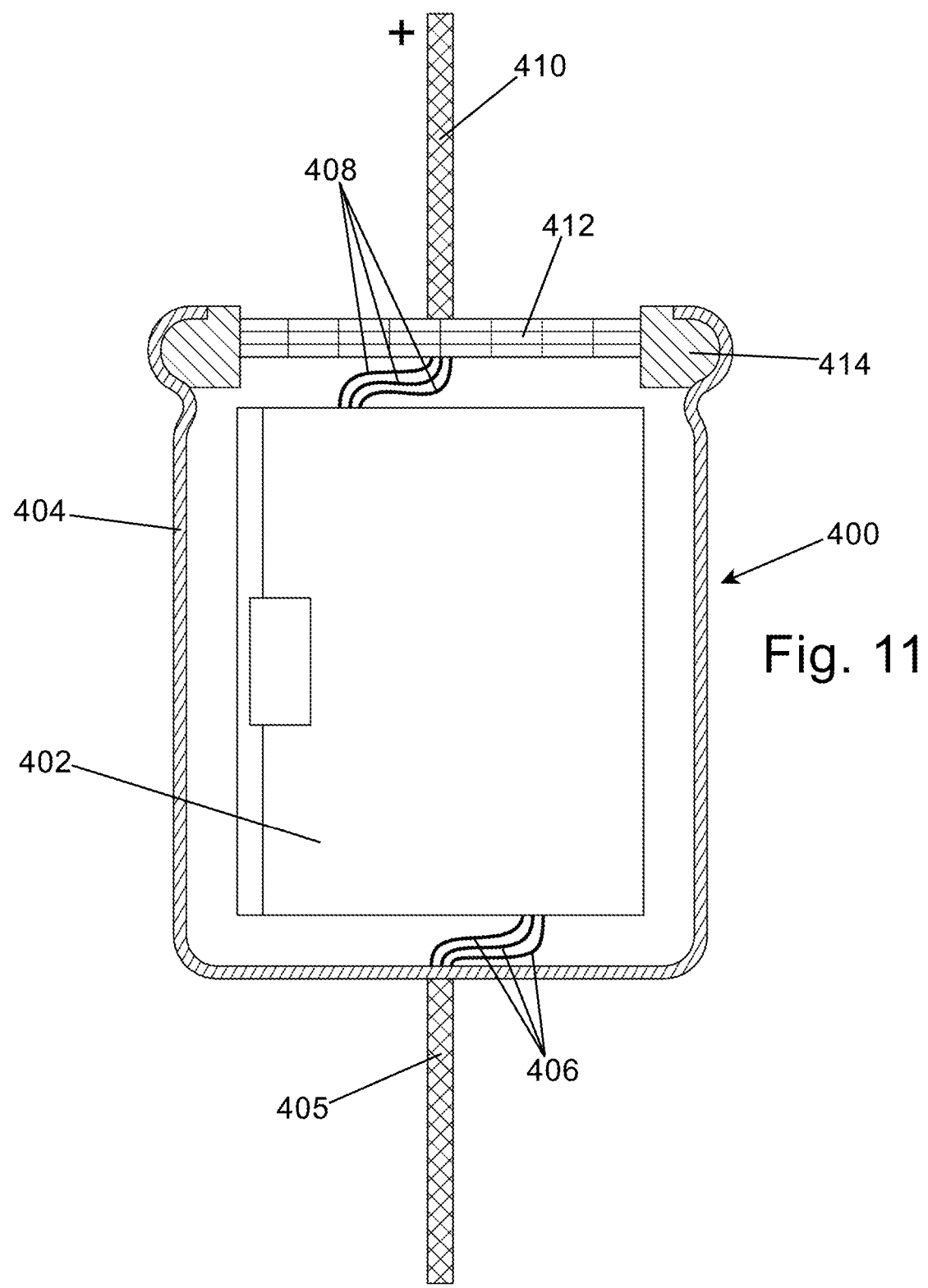
FIG. 11 is a cross-sectional schematic view of an embodiment of the invention.

An axial capacitor is illustrated in cross-sectional schematic view in FIG. 11. In FIG. 11, the capacitor, generally represented at 400, comprises a working element, 402, as described herein, within a housing, 404. The housing, which may be referred to as a can in the art, is preferably conductive and may function as a lead or be in electrical contact with a lower lead, 405, which is preferably the cathode lead. Lower tabs, 406, which are preferably cathode tabs, are in electrical contact with the housing or lower lead. Upper tabs, 408, which are preferably anode tabs, are in electrical contact with an upper lead, 410, which is preferably an anode lead or the upper tabs are in electrical contact with a conductive lid, 412, which is then in electrical contact with the upper lead. A seal, 414, such as a gasket seals the housing to inhibit atmospheric exchange between the interior of the housing and ambient atmosphere. In one embodiment the seal and lid form a hermetic seal. The seal may be a resin material, particularly an epoxy resin or a rubber materials such as ethylene propylene diene terpolymer (EPT) or a butyl rubber (IIR).

The anode is a conductive metal preferably in the form of a foil. The conductive metal is preferably a valve metal or a conductive oxide of the valve metal. Particularly preferred anodes comprise a valve metal such as tantalum, aluminum, niobium, titanium, zirconium, hafnium, alloys of these elements, or a conductive oxide thereof such as NbO. Aluminum is a particularly preferred anode material.

An oxide film is preferably formed on the anode as the dielectric. The dielectric may be formed using any suitable electrolyte solution, referred to as a forming electrolyte, such as a phosphoric acid or a phosphate-containing solution. A formation voltage of from about 9 V to about 450 V is commonly applied. The formation voltage typically ranges from 2.0 to 3.5 times the rated voltage of the capacitor.

The conductive polymer application process is generally selected from in-situ polymer formation and application of a preformed polymer from a slurry such as by a coating process. For the in-situ process impregnating solutions are applied to the surface wherein the impregnating solutions preferably contain monomer, oxidizing agent, dopant and other adjuvants as known to those of skill in the art. The selection of a suitable solvent for the solution is well within the level of skill in the art. Examples of suitable solvents include ketones and alcohols such as acetone, pyridine, tetrahydrofuran, methanol, ethanol, 2-propanol, and 1-butanol. The monomer concentration may be from about 1.5 wt. % to about 20 wt. %, more preferably from about 5 wt. % to about 15 wt. % for demonstration of the invention. Suitable monomers for preparing conductive polymers include but are not limited to aniline, pyrrole, thiophene, and derivatives thereof. A preferred monomer is 3,4-ethylenedioxythiophene. The oxidizing agent concentration may be from about 6 wt. % to about 45 wt. % and more preferably from about 16 wt. % to about 42 wt. % for demonstration of the invention. Oxidizing agents for preparing conductive polymers include Fe(III) salts of organic and inorganic acids, alkali metal persulfates, ammonium persulfate, and others. A preferred oxidant for demonstration of the invention is Fe(III) tosylate. The dopant concentration may be from about 5 wt. % to about 30 wt. % and more preferably from about 12 wt. % to about 25 wt. %. Any suitable dopant may be used, such as dodecyl benzenesulfonate, p-tosylate, or chloride. The preferred dopant is p-tosylate. The pellets are cured at a temperature of from 65° C. to about 160° C. and more preferably from about 80° C. to about 120° C. thereby allowing the monomer to polymerize. After curing, the polymer layer is preferably washed in deionized water or another solvent.

Application of a preformed polymer from a slurry is a preferred method. The polymer can be prepared as a slurry or obtained commercially as a slurry and applied to the surface, without particular limit to the technique, preferably followed by drying. A slurry of polymerized 3,4-ethylenedioxythiophene with a particle size of at least 0.5 nm to no more than 200 nm, more preferably at least 20 nm to no more than 200 nm, in a solvent is exemplary for demonstration of the invention. For application to the separator it is preferable that the slurry be allowed to impregnate the separator sufficiently prior to drying. It is preferable that a continuous coating of conductive polymer be applied to maximize the surface area of conductivity. In a particularly preferred embodiment at least 80% of the surface area of the anode and at least 80% of the surface area of the cathode is coated with conductive polymer. More preferably, at least 90% of the surface area of the anode and at least 90% of the surface area of the cathode is coated with conductive polymer and most preferably at least 99% of the surface area of the anode and at least 99% of the surface area of the cathode is coated with conductive polymer.

The liquid electrolyte is a solvent preferably with a supporting salt therein. Any conventional solvent can be used with exemplary solvents including γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof. Though not required a supporting salt is preferred. Exemplary supporting salts include inorganic acid ammonium salts, inorganic acid amine salts, inorganic acid alkyl substituted amide salts, organic ammonium salts, organic acid amide salts, organic acid alkyl substituted amide salts and derivatives thereof. Any gas absorbents or cathode electrochemical depolarizers can be used. Exemplary supported additives include nitro derivatives of organic alcohols, acids, esters, aromatic derivatives such as o-, m-, p-nitroanisole, o-, m-, p-nitrobenzoic acid, o-, m-, p-nitrobenzene alcohol. A particularly hybrid capacitor comprises up to 50 wt % liquid electrolyte.

The separator is not particularly limited herein and any commercially available separator can be used to demonstrate the invention with the proviso that it is a material used for the conductive separator can either be coated with, or impregnated with, a conductive polymer. Alternatively, or in addition to the conductive polymer, the separator may itself be a conductive material. Exemplary separators for the conductive separator function as a skeleton layer for the conductive polymer. The separator can be fabricated in the form of a sheet of different dimensions which can be wound in rolls, reels etc. or the separator can be in the form of a paste or gel. The anode foil can function as a support for the separator wherein the anode foil has an insulator layer formed on the surface thereof with a conductive polymer coating on the insulator and with a conductive separator layer formed on the polymer coating. The use of the anode as a support may minimize operating difficulty. The separator is a porous conductive layer which allows direct electrical contact between the anode conductive polymer layer and a cathode. Preferably, the separator has a volume of pores for liquid electrolyte to transit through. Paper or other non-conductive materials, such as polymers, can be used as support for the conductive polymer. Paper is an exemplary separator due to the widespread use and availability. Unlike prior art capacitors the paper does not need to be charred for use as a conductive separator. In the manufacture of prior art capacitors the paper is often charred after formation of the working element to minimize the amount of polymer absorbed into the paper. With the present invention this is unnecessary since the separator is either coated with conductive polymer or impregnated with conductive polymer to form the conductive separator. The separator may be a fibrous material, such as paper fiber, either physically intermingled or cross-linked to form a continual fibrous, such as paper fiber, layer. The space between the fibers might be partly or fully filled with the high conductivity component. Paper based separators can be manufactured by modification of a finished paper layer or by modification of paper with high conductivity component fibers before forming of paper layer, a dispersion of conductive fibers, pieces, particles or their agglomerates in a liquid or solid state or a deposition of conductive fibers, pieces, particles. The conductive fibers, pieces or particles may comprise a conductive material such as conductive polymer, carbon black, graphite, metal etc., or can be a composite material consisting of a non-conductive core such as paper, plastic etc., modified with a conductive material such as conductive polymer, carbon black, graphite, metal etc.

The conductive separator and non-conductive separator may comprise the same material with the conductive separator having a conductive coating thereon or being impregnated with a conductor neither of which is necessary in the non-conductive separator.

In one embodiment the separator comprises reactive groups, particularly on the surface of the separator, wherein the reactive groups are suitable for reaction with a reactive group of the conductive layer thereby allowing the conductive polymer on the separator to be crosslinked to the conductive polymer thereon to increase the adhesion of the conductive polymer to the separator. Particularly preferred reactive groups include reactive groups such as epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts or quaternary ammonium salts which can be crosslinked with reactive groups on the liquid electrolyte.

A particularly preferred separator has a width which is suitable for the working element length or production process with a width of 1.5 cm to 500 cm being exemplary for demonstration of the invention. The length is chosen based on the desired capacitance as capacitance is a function of anode and cathode overlap and is therefore directly related to length and width of the cathode and anode. A separator with a length of 0.1 m to 400 m and thickness of 10 μm up to 300 μm is exemplary for demonstration of the invention.

The conductive polymer is preferably selected from polyaniline, polypyrrole and polythiophene or substitutional derivatives thereof.

A particularly preferred conducting polymer is represented by Formula I:

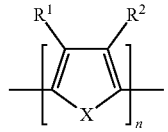

FORMULA 1 wherein $R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—$(CH_2)_2$—O— is most preferred. In Formula 1, X is S or N and most preferable X is S. A particularly preferred conductive polymer is polymerized 3,4-polyethylene dioxythiophene (PEDOT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR3; or R1 and R2, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. R3 preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

The crosslinker is a material which forms an intermolecular bond with, or by, the reactive group of the solid electrolyte with a reactive group of the liquid electrolyte. Particularly preferred crosslinkers include silanes such as glycidyl silane and organofunctional silanes, epoxides, ethers such as glycidyl ether, epoxy crosslinkers and hydrophilic coupling agents.

Organofunctional silane is defined by the formula:

$XR_1Si(R_3)_{3-n}(R_2)_n$ wherein X is an organic functional group such as amino, epoxy, anhydride, hydroxy, mercapto, sulfonate, carboxylate, phosphonate, halogen, vinyl, methacryloxy, ester, alkyl, etc; R1 is an aryl or alkyl $(CH_2)_m$ wherein m can be 0 to 14; R2 is individually a hydrolysable functional group such as alkoxy, acyloxy, halogen, amine or their hydrolyzed product; $R_3$ is individually an alkyl functional group of 1-6 carbons; n is 1 to 3.

The organofunctional silane can also be dipodal, define by the formula:

$Y(Si(R_3)_{3-n}(R_2)_n)_2$ wherein Y is any organic moiety that contains reactive or nonreactive functional groups, such as alkyl, aryl, sulfide or melamine; $R_3$, $R_2$ and n are defined above. The organofunctional silane can also be multi-functional or polymeric silanes, such as silane modified polybutadiene, or silane modified polyamine, etc.

Examples of organofunctional silane include 3-glycidoxypropyltrimethoxysilane, 3-aminopropytriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane, bis(triethoxysilyl)octane, etc. The examples are used to illustrate the invention and should not be regarded as conclusive.

A particularly preferred organofunctional silane is glycidyl silane defined by the formula:

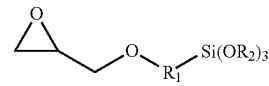

wherein $R_1$ is an alkyl of 1 to 14 carbons and more preferably selected from methyl ethyl and propyl; and each $R_2$ is independently an alkyl or substituted alkyl of 1 to 6 carbons.

A particularly preferred glycidyl silane is 3-glycidoxypropyltrimethoxysilane defined by the formula:

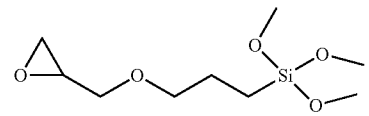

which is referred to herein as "Silane A" for convenience.

The second crosslinker, which is an organic compound with at least two functional groups selected from epoxy and carboxylic acid, has a concentration preferred range from about 0.1 wt % to about 10 wt % of the conductive polymer dispersion at a percents solids of about 0.2 to about 10 wt %. More preferably, the glycidyl ether concentration may range from about 0.2 wt % to about 5 wt % of the conductive polymer and even more preferably about 0.2 wt % to about 2 wt %.

The second crosslinker with at least two epoxy groups is referred to herein as an epoxy crosslinking compound and is defined by the formula:

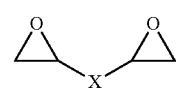

wherein the X is an alkyl or substituted alkyl of 0-14 carbons, preferably 0-6 carbons; an aryl or substituted aryl, an ethylene ether or substituted ethylene ether, polyethylene ether or substituted polyethylene ether with 2-20 ethylene ether groups or combinations thereof. A particularly preferred substitute is an epoxy group.

Examples of epoxy crosslinking compounds having more than one epoxy groups include ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, etc.

A preferred epoxy crosslinking compound is glycidyl ether, defined by the formula:

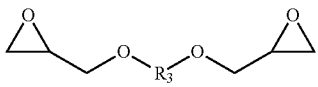

wherein R₃ is an alkyl or substituted alkyl of 1-14 carbons, preferably 2-6 carbons; an ethylene ether or polyethylene ether with 2-20 ethylene ether groups; a alkyl substituted with a group selected from hydroxy, or

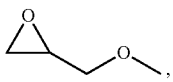

or
—(CH₂OH)ₓCH₂OH wherein X is 1 to 14.
Particularly preferred glycidyl ethers are represented by:

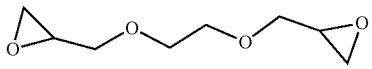 [SMILES: C(COCC1CO1)OCC1CO1]

EGDGE: ethylene glycol diglycidyl ether

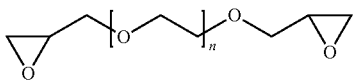

where n is an integer of 1 to 220;
PEGDGE: polyethylene glycol diglycidyl ether

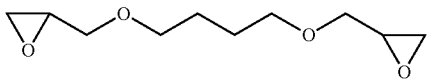 [SMILES: C(CCOCC1CO1)COCC1CO1]

BDDGE: 1,4-butanediol diglycidyl ether

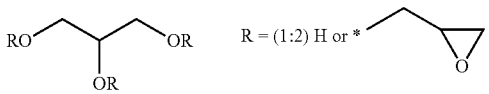

R=(1:2) indicates that one of the R groups is hydrogen and the other 2 are the epoxide;
GDGE: glycerol diglycidyl ether

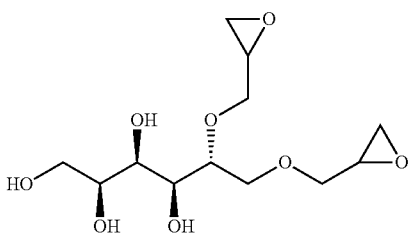 [SMILES: OC[C@H](O)[C@@H](O)[C@H](O)[C@@H](COCC1CO1)OCC1CO1]

Sorbitol-DGE: sorbitol diglycidyl ether.

The organic compound with at least two carboxylic functional groups is referred to herein as a carboxylic crosslinking compound.

Examples of carboxylic crosslinking compounds include but are not limited by, oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid, polyacrylic acid, etc. Particularly preferred organic acids are aromatic acid such as phthalic acid, and particularly ortho-phthalic acid, which decreases ESR.

A layer can be crosslinked within the layer, referred to herein as intralayer crosslinking, by incorporating a crosslinker which reacts with a functional group of a component of the conductive polymer or a component incorporated within the layer of the conductive polymer layer. A layer can be crosslinked to an adjacent layer, referred to here as interlayer crosslinking, by incorporating a crosslinker in one layer which reacts with a functional group of a component of the conductive polymer or a component incorporated within the adjacent layer.

The solid electrolyte preferable includes at least one additive selected from fibers, dopants, crosslinkers, binders and nanoparticles wherein the additive comprises the reactive group of the solid electrolyte.

Particularly preferred nanoparticles are functionalized nanoparticles wherein the surface of the nanoparticles has been derivitized to include reactive groups.

Binders can be also incorporated into the conductive polymer layer if desired. Suitable binders include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers. In one embodiment the binder comprises a solid electrolyte reactive group.

The conductive polymer, binder, dopants or other components of the solid electrolyte comprise reactive groups such as epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts or quaternary ammonium salts which can be crosslinked with reactive groups on the liquid electrolyte. The liquid electrolyte comprises electrolytes solvents, anions, electrolytes and other additives with reactive groups such as epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts or quaternary ammonium salts which can be crosslinked with the reactive groups of the solid electrolyte. By crosslinking the liquid electrolyte with the solid electrolyte the electrolyte of the liquid electrolyte is still mobile yet the other components of the liquid electrolyte are more difficult to remove from the electrolyte from the liquid electrolyte thereby increasing the performance in higher temperatures.

The solid electrolyte may include fibers suitable for facilitating absorption of the liquid electrolyte. Particularly suitable fibers are fibers and nanofibers prepared from polymers such as polyacrylonitrile, cellulose, polyethylene oxide, polymethylmethacrylate, polyamide, polyaniline, polyvinyl alcohol, nanofibers derived from cellulose, nanofibers electrospun from conducting polymers such as polyaniline, polythiophene, polypyrrole, etc. Fibers with a length of no more than 100 nm and diameter of no more than 50 nm are preferred. Microfibers or nanofibers prepared by milling can also be used. Hollow fibers and fibers with higher electrolyte absorption properties are preferred.

At least one component of the liquid electrolyte, also referred to as an impregnating electrolyte, comprises components with reactive groups otherwise, any conventionally known electrolytic solution may be employed. Preferably, however, a liquid electrolytic comprises solvents, such as non-aqueous solvents or aprotic solvents, an organic salt, cations, anions, electrolytes and other compounds. Particularly preferred additives for the liquid electrolyte include ethers, amides, oxazolidinones, nitriles, glycols, glymes, glycerols, lactones, carbonates, sulfones or polyols.

In the liquid electrolyte the organic salt refers to a salt in which at least one of the base and the acid that are constituent elements of the salt is organic. Gamma-butyrolactone or sulfolane, or a mixture thereof, are particularly suitable non-aqueous solvents with high reliability and a low specific resistance. Organic amine salts are suitable for demonstration of the invention. Organic amine salt refers to a salt of an organic amine and an organic or inorganic acid. Among organic amine salts, a salt of an organic amine and an organic acid is preferably used, and examples thereof include, triethylamine borodisalicylate, ethyldimethylamine phthalate, mono 1,2,3,4-tetramethylimidazolinium phthalate, mono 1,3-dimethyl-2-ethylimidazolinium phthalate, and a mixture of them.

Particularly preferred additives for the liquid electrolyte include polyols, glycerines, polyethylene glycols, poly(ethylene glycol) diacrylates, tetramethyl ammonium phthalates, γ-butyrolactones, ethylated γ-butyrolactones, propylated γ-butyrolactones, and β-propiolactones, dimethoxyethanes (DME), diglymes (diethylene glycol dimethyl ethers), triglymes (triethylene glycol dimethyl ethers), ethylene glycol diethyl ethers (DEE), and diethylene glycol diethyl ethers, polyethylene glycol dimethyl ethers, and at least one other organic solvent. Other additives include hyperbranched polyglycidol, hyperbranched polyalkylene glycols, poly(allyl glycidyl ether), poly(ethoxy ethyl glycidyl ether), copolymers of methyl glycidyl ether and allyl glycidyl ether, copolymers of methyl glycidyl ether and n-butyl glycidyl ether, hyperbranched copolymers comprising polymerizing glycidol of glycidyl ether monomer such as methyl glycidyl ether, poly(ethylene glycol) methyl ether acrylate, methoxy-polyethylene glycol amine, O-(carboxymethyl)-O'-methyl-polyethylene glycol, methoxy poly(ethylene glycol), polyethylene glycol monomethyl ether, methoxypolyethylene glycol maleimide, and poly(ethylene glycol) methyl ether methacrylate.

Exemplary aprotic solvents in the liquid electrolyte include: ethers, amides, oxazolidinones, lactones, nitriles, carbonates, sulfones, and other organic solvents. Exemplary ethers include: monoethers, such as ethylene glycol monobutyl ether; ethylene glycol monophenyl ether, tetrahydrofuran, and 3-methyltetrahydrofuran, etc.; diethers, such as ethylene glycol dimethyl ether, ethylene glycol diethyl ether, diethylene glycol monomethyl ether, and diethylene glycol monoethyl ether, etc.; and triethers, such as diethylene glycol dimethyl ether, and diethylene glycol diethyl ether, etc. Examples amides include: formamides, such as N-methylformamide, N,N-dimethylformamide, N-ethylformamide, and N,N-diethylformamide, etc.; acetamides, such as N-methylacetamide, N,N-dimethylacetamide, N-ethylacetamide, and N,N-diethylacetamide, etc.; propionamides, such as N,N-dimethylpropionamide, etc.; pyrrolidones, such as N-methylpyrrolidone; and N-ethylpyrrolidone, etc.; and hexamethyl phosphoryl amide, etc. Examples oxazolidinones include N-methyl-2-oxazolidinone, 3,5-dimethyl-2-oxazolidinone, etc. Exemplary lactones include γ-butyrolactone, α-acetyl-γ-butyrolactone; β-butyrolactone, γ-valerolactone, and δ-valerolactone; etc. Exemplary nitriles include: acetonitrile, propionitrile, butyronitrile; acrylonitrile, methacrylonitrile, and benzonitrile, etc. Exemplary carbonates include: ethylene carbonate, propylene carbonate, butylene carbonate, dimethyl carbonate, and diethyl carbonate, etc. Exemplary sulfones include: sulfolane, and dimethyl sulfone, etc. Examples other organic solvents include: 1,3-dimethyl-2-imidazolidinone, dimethyl sulfoxide, aromatic solvents (toluene, xylene, etc.), and paraffin solvents (normal paraffin, isoparaffin, etc.), etc.

Aprotic solvents may be used alone or in combinations of two or more solvents in the liquid electrolyte. Among them, lactone and sulfone are preferred, γ-butyrolactone and sulfolane are more preferred, and γ-butyrolactone is particularly preferred.

In one embodiment the solvent has a boiling point of higher than 200° C. and a dielectric constant of higher than 35.

The liquid electrolyte preferably contains a cation represented by Formula II and an anion.

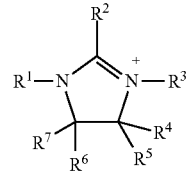

Formula II

In Formula II, $R^1$ to $R^3$ are each $C_{1-3}$ alkyl, and $R^4$ to $R^7$ are each $C_{1-3}$ alkyl or a hydrogen atom. Examples of the $C_{1-3}$ alkyl include: methyl, ethyl, n-propyl and isopropyl.

Exemplary cations include: 1,2,3,4-tetramethylimidazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethyl-imidazolinium, 1,2,3-trimethylimidazolinium, 1,3-dimethyl-2-ethylimidazolinium, 1-ethyl-2,3-dimethyl-imidazolinium, and 1,2,3-triethylimidazolinium, etc. with 1,2,3,4-tetramethylimidazolinium and 1-ethyl-2,3-dimethyl-imidazolinium being more preferred.

Exemplary anions in the liquid electrolyte include the anions of various organic acids and/or inorganic acids commonly used in electrolytic solutions. In the case of an organic acid and/or inorganic acid having a valence of two or more, the anion is preferably a monoanion.

The organic acid and inorganic acid are exemplified by carboxylic acids, phenols, mono- and di-alkyl phosphates containing $C_{1-15}$ alkyl, sulfonic acids, inorganic acids, and others. Exemplary carboxylic acids include: $C_{2-15}$ polycarboxylic acid having a valence of 2 to 4 including: aliphatic polycarboxylic acids, such as saturated polycarboxylic acids, particularly oxalic acid, malonic acid, succinic acid, glutaric acid, adipic acid, pimelic acid, superic acid, azelaic acid, and sebacic acid, etc., and unsaturated polycarboxylic acids particularly maleic acid, fumaric acid, and itaconic acid, etc., aromatic polycarboxylic acids, such as phthalic acid, isophthalic acid, terephthalic acid, trimellitic acid, and pyromellitic acid, etc.; and S-containing polycarboxylic acids, such as thiodipropionic acid, etc: $C_{2-20}$ hydroxycarboxylic acid including aliphatic hydroxycarboxylic acids, such as glycolic acid, lactic acid, tartaric acid, and castor oil fatty acid, etc.; aromatic hydroxycarboxylic acid, such as salicylic acid, and mandelic acid, etc; $C_{1-30}$ monocarboxylic acid including aliphatic monocarboxylic acids, such as saturated monocarboxylic acids including formic acid, acetic acid, propionic acid, butyric acid, isobutyric acid, valeric acid, caproic acid, enanthic acid, caprylic acid, pelargonic acid, ularic acid, myristic acid, stearic acid and behenic acid, etc.), unsaturated monocarboxylic acids such as acrylic acid, methacrylic acid, crotonic acid and oleic acid, etc.; and aromatic monocarboxylic acids, such as benzoic acid, cinnamic acid, and naphthoic acid, etc. Exemplary phenols include monohydric phenol including phenols and naphthols including phenol, $C_{1-15}$ alkyl phenols such as cresol, xylenol, ethylphenol, n- or isopropylphenol, and isododecylphenol, etc., methoxyphenols such as eugenol, and guaiacol, etc., α-naphthol, β-naphthol, and cyclohexylphenol, etc., polyhydric phenols including catechol, resorcin, pyrogallol, phloroglucin, bisphenol A, bisphenol F, and bisphenol S, etc. Exemplary Mono- and di-alkyl phosphates containing $C_{1-15}$ alkyl include mono- and di-methyl phosphates, mono- and di-ethyl phosphates, mono- and di-isopropyl phosphates, mono- and di-butyl phosphates, mono- and di-(2-ethylhexyl) phosphates, mono- and di-isodecyl phosphates, etc. Exemplary sulfonic acids include: $C_{1-15}$ alkyl benzenesulfonic acid such as p-toluenesulfonic acid, nonylbenzenesulfonic acid, and dodecylbenzenesulfonic acid, etc., sulfosalicylic acid, methanesulfonic acid, and trifluoromethanesulfonic acid, etc. Exemplary inorganic acids include: phosphoric acid, tetrafluoroboric acid, perchloric acid, hexafluorophosphoric acid, hexafluoroantimonic acid, and hexafluoroarsenic acid, etc. Other examples include imide anion of trifluoromethane sulfonylimide or the like, and methide anion of trifluoromethane sulfonylmethide or the like.

The electrolyte in the liquid electrolyte is represented by a combination of the cation and the anion, preferably including one from the following: 1,2,3,4-tetramethylimidazolinium/phthalate monoanion, 1-ethyl-2,3-dimethylimidazolinium/phthalate monoanion, 1,2,3,4-tetramethylimidazolinium/maleate monoanion, 1-ethyl-2,3-dimethylimidazolinium cation/maleate monoanion, 1,2,3,4-tetramethylimidazolinum/diethylphosphate anion, 1-ethyl-2,3-dimethylimidazolinum cation/diethylphosphate anion, 1,2,3,4-tetramethylimidazolinium/dibutylphosphate anion, 1-ethyl-2,3-dimethylimidazolinium cation/dibutylphosphate anion, 1,2,3,4-tetramethylimidazolinium/diisopropylphosphate anion, and 1-ethyl-2,3-dimethylimidazolinium cation/diisopropylphosphate anion and most preferably selected from 1,2,3,4-tetramethylimidazolinium/phthalate monoanion, 1-ethyl-2,3-dimethylimidazolinium/phthalatemonoanion, 1,2,3,4-tetramethylimidazolinium/maleate monoanion, and 1-ethyl-2,3-dimethylimidazolinium cation/maleate monoanion.

The concentration of the organic salt in the non-aqueous solvent is not limited to a particular concentration, and a usually employed concentration may appropriately be employed. The concentration may be for example 5 to 50 wt %.

Other adjuvants, coatings, and related elements can be incorporated into a capacitor as known in the art, without diverting from the present invention. Mentioned, as a non-limiting summary include, protective layers, multiple capacitive levels, terminals, leads, etc.

A particular feature of the invention is the ability to provide a capacitor with a high voltage. By utilizing the conductive separator a capacitor with a rated voltage capability of 15 V to 250 V can be obtained. Furthermore, the capacitors can be made larger such as a diameter of 10 mm to 30 mm and larger with lengths of 15 mm to 50 mm or larger.

Comparative Study

Figure 5:
FIG. 5 is a schematic representation illustrating an advantage of the invention.

The deficiencies of the prior art hybrid capacitors can be realized by observing the components in a commercially available product such as a capacitor with a working element having a diameter of about 10 mm and length of about 8 mm. The impact of the prior art process of forming the polymer layer after winding is visually indicated as unevenly coated foil and separator with a concentration of conductive polymer located around the last turn of the winding and in the bottom of the winding. In exemplary cases less than 40% of the foil is coated with conductive polymer indicating at least 60% of the foil is ineffective at fully contributing to the capacitance. FIG. 5 provides a schematic representation of the differences between the prior art and the instant invention wherein only the outer extent of the prior art anode, represented by A, is coated with the central portion lacking any conductive polymer coating whereas, for the inventive example, represented by B, the entire surface is coated with conductive polymer.

Example 1 (E-1)

Anodized aluminum anode foils and aluminum cathode foils of sizes and capacitance rating as shown in Table 1 were heat treated at 300±5° C. for 30±5 min. The anode foil was subjected to a first edge formation treatment by immersing in 5% oxalic acid at 30±5° C. at a voltage of 5 mA/cm². The foil was washed for a minimum of 5 minutes and dried at 125±5° C. for 25-30 min. The anode foil was heat treated at 300±5° C. for 30±5 min followed by a second edge formation in 1% ammonium citrate at a voltage of 1.5 mA/cm² at 50±5° C. followed by washing for at least 5 min and drying at 125±5° C. for 25-30 min. The anode and cathode were subjected to a silane treatment for 15-30 sec. in a solution comprising 4935 ml+/−50 ml DI Water, 15 ml+/−0.5 ml acetic acid and 50 ml+/−1 ml 3-glycidoxypropyltrimethoxysilane at a pH of 3.0+/−1.0. The anode and cathode foils were again heat treated 300±5° C. for 30±5 min. The anode was anodized again to oxidize the edges in 0.1% ammonium phosphate at a voltage of 1.5 mA/cm² at 55±5° C. followed by washing for at least 5 minutes and drying at 125±5° C. for 25-30 minutes. The silane treatment was repeated for 15-30 seconds followed by air drying for 15-20 min. The silane was cured at 125+/−5° C. 15+/−3 minutes. The conductive polymer layer was applied by pulling the anode and cathode through a slurry comprising poly-3,4-ethylenedioxythiophene (PEDOT) and polystyrene sulfonate (PSS) at a speed of 3 mm/sec followed by drying initially at 80° C. for about 10 min then at 150° C. for about 10 minutes followed by allowing the coatings to cool down to room temperature. The polymer coating was repeated three times with drying between coats. The percentage of projective and real surface area covered with polymer was observed to be about 100% for all components including the cathode foil, anode foil, and separator. All components were observed to be flexible and suitable for winding as an axial capacitor without generating cracks. The components are stable during long term storage. The capacitors were tested and the results are presented in Table 1.

Example 2 (E-2)

Example 1 was repeated except for application of the polymer which was applied by spraying a slurry with the same observed coverage as in Example 1.

Example 3 (E-3)

Samples were made using same anodes and cathodes as Example 1 except that the conductive polymer was added by prior art methods as set forth in U.S. Pat. No. 8,767,377. The results are presented in Table 1.

TABLE 1

| Process | Size (Diameter × Length), mm | $V_R$, V | Capacitance, uF | CV, mF*V |
|---|---|---|---|---|
| E-1 | D10 × L20 + Polymer | 40 | 116 | 4.64 |
| E-3 | D20 × L27 + Polymer | 40 | 570 | 22.8 |
| E-1 | D20 × L27 + Polymer | 40 | 1480 | 59.2 |
| E-3 | D20 × L27 + Polymer | 63 | 158 | 9.95 |
| E-1 | D20 × L27 + Polymer | 63 | 480 | 30.24 |

In Table 1, $V_R$ is rated voltage and CV is capacitance × volts. In the examples the capacitance, with the same size anode and cathode, was almost three times as high for E-1 as for E-3.

Figure 6:
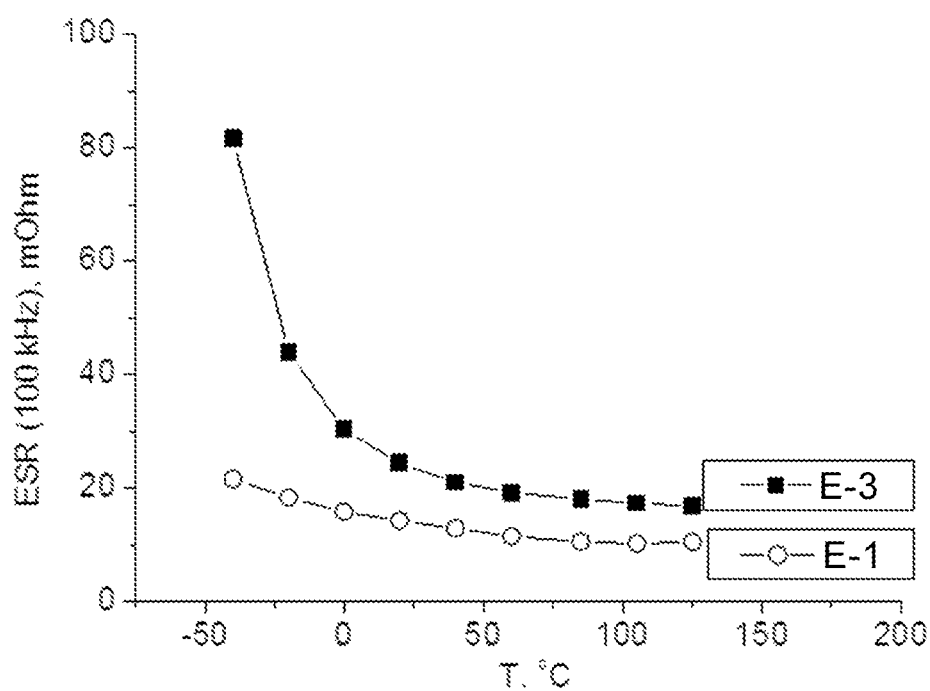
FIGS. 6-10 are graphical representations illustrating electrical performance.
Figure 7:
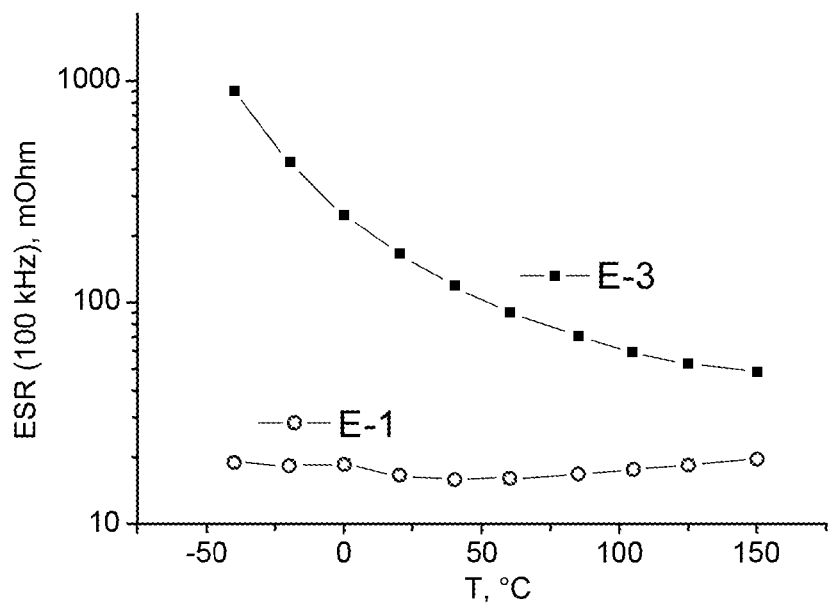
Figure 8:
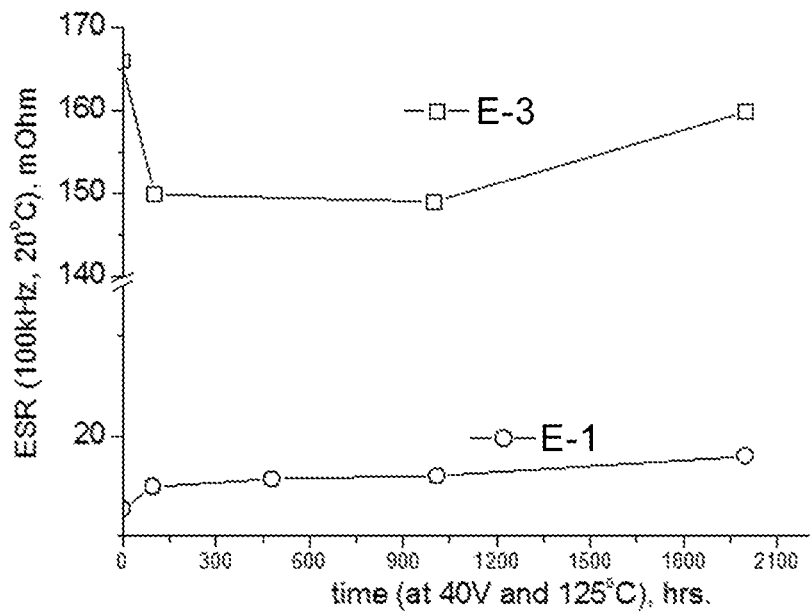
Figure 9:
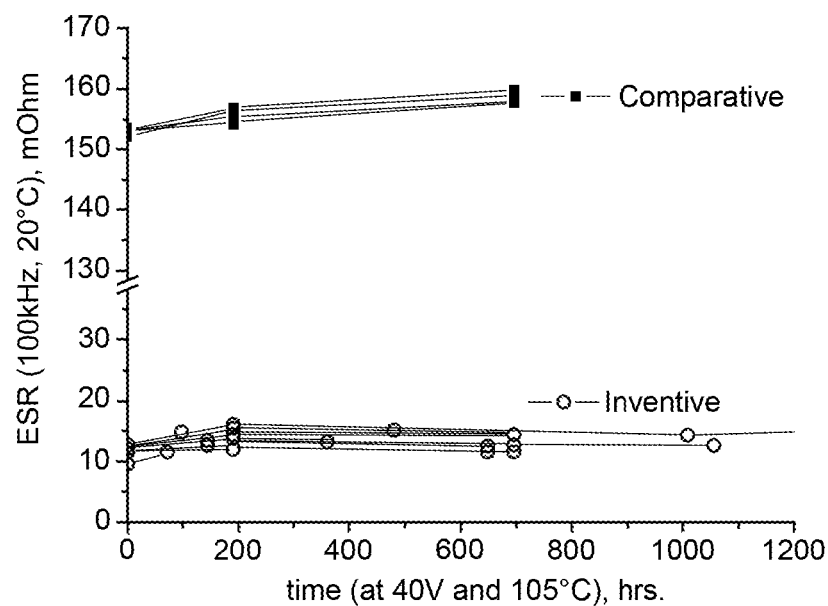
Figure 10:
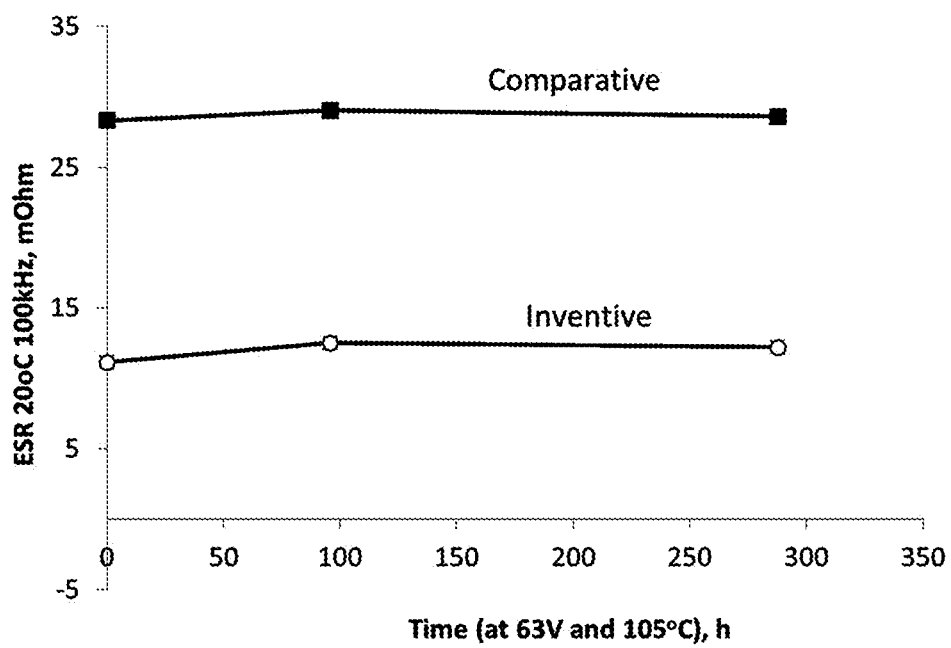

The results obtained for E-1 was successfully applied for manufacturing of axial capacitors of various case sizes. CV for 40-63V capacitors was approximately three times higher for the E-1 than for the E-3. Life tests demonstrated that manufactured prototypes demonstrate high stability during several hours at high temperature and rated voltages. Low ESR and suppressed temperature dependence were achieved for the prototypes at the same time with high CV values. FIGS. 6-10 illustrate the electrical performance. FIG. 6 illustrates the improvement in ESR as a function of temperature for an axial capacitor with diameter of 20 mm and length of 27 mm with a rated voltage of 40 V. FIG. 7 illustrates the improvement in ESR as a function of temperature for an axial capacitor with diameter of 10 mm and length of 20 mm with a rated voltage of 40 V. FIG. 8 illustrates the improvement in ESR as a function of time at 125° C. for an axial capacitor with diameter of 10 mm and length of 20 mm with a rated voltage of 40 V. FIG. 9 illustrates improvements in ESR as a function of time at 105° C. for a series of prior art, comparative, hybrid 40 V capacitors versus a series of inventive capacitors and FIG. 10 illustrates improvements in ESR as a function of time at 105° C. for a comparative, hybrid 63 V capacitor versus an inventive capacitor.

A series of capacitors were prepared for a determination of the ESR shift as a function of frequency. A control axial electrolytic capacitor was prepared as were fully asymmetrical capacitor, as described herein, a symmetrical capacitor, having conductive polymer on both sides of the anode and having a single polymer layer coated on the dielectric, designated HAC-1, and a symmetrical capacitor, having conductive polymer on both sides of the anode and having three polymer layers coated on the dielectric, designated HAC-3. The advantages of the asymmetry, and additional conductivity in the conductive polymer layer by the use of additional coated layers, is illustrated graphically in FIG. 18.

Examples with Crosslinking

To test the impact of internal cross-linking on polymer adhesion properties three groups of samples were prepared on glass slabs.

In Group 1 glass slabs were coated with conductive polymer slurry and then dried at 80° C. for 15 min and cured at 150° C. for 15 min.

In Group 2 glass slabs were treated with a solution of 3-glycidoxypropyltrimethoxysilane then dried at 125° C. 15 min. After this the slabs were coated with a conductive polymer slurry followed by drying at 80° C. for 15 min and curing at 150° C. for 15 min.

In Group 3 glass slabs were treated with a solution of 3-glycidoxypropyltrimethoxysilane followed by drying at 125° C. for 15 min. After this the slabs were coated with a conductive polymer slurry followed by drying at 80° C. for 15 min and curing at 150° C. for 15 min. The samples were treated with the silane solution following by drying at 125° C. for 15 min.

The samples from Groups 1-3 were placed in vessels with the conductive polymer coating partially immersed in an electrolyte, hermetically closed and subjected to high temperature storage at different conditions. Test 1 was a 48 hr test at room temperature. Test 2 was a 96 hr test at 125° C. Test 3 was a 24 hr test at 150° C. After the tests all samples were rinsed with DI water.

In each test that portion of the Group 1 samples immersed in electrode delaminated up to the immersion level. Conductive polymer is not effectively adhered to the surface after immersion in electrolyte at room temperature. If incorporated into a hybrid capacitor the capacitor most probably would have a very poor ESR stability.

Group 2 showed a moderate level of stability. The conductive layer immersed in the electrolyte adhered to the glass slab stronger than in Group 1 and almost all polymer remained adhered under room temperature conditions. However, after storage in the electrolyte at higher temperature a significant portion of the conductive polymer layer below the immersion level was detached. Group 3 demonstrated the best adhesion even at the most harsh conditions of Test 3. In this case the polymer layer was reinforced on subparticle level and chemically coupled to the surface.

ESR measurements conducted for hybrid wound capacitors of having a diameter of 10 mm and a length of 20 mm (D10×L20) is presented in FIG. 22. In FIG. 22 hybrid capacitor (E-4) was assembled from an anode with silane pre-treatment and conductive polymer coating, a conductive separator using paper impregnated with conductive polymer slurry with following curing and a carbon coated cathode. Hybrid capacitor (E-5) represents a hybrid prototype where all polymer layers on all the materials were post-treated with silane to ensure full cross-linking for the conductive polymer pathway.

The results clearly show much higher stability and better performance of the prototype with full cross-linking approach applied.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:
1. A capacitor comprising:
   a working element comprising:

an anode comprising a first dielectric and an anode conductive polymer layer on said first dielectric;
a cathode; and
a separator between said anode conductive polymer layer and said cathode wherein said separator comprises a separator conductive polymer layer wherein at least one of said anode conductive polymer layer or said separator conductive polymer layer is crosslinked; and
a liquid electrolyte.

2. The capacitor of claim 1 wherein at least one of said anode, said separator or said cathode further comprises reactive functional groups.

3. The capacitor of claim 2 wherein said separator comprises a reactive functional group of said reactive functional groups and said reactive functional group is reacted with a second reactive functional group of said reactive functional groups in said separator conductive polymer layer.

4. The capacitor of claim 2 wherein a first reactive functional group of said reactive functional groups is crosslinked with a second reactive functional group of said reactive functional groups.

5. The capacitor of claim 4 wherein said first reactive functional group and said second reactive functional group are in a common layer.

6. The capacitor of claim 4 wherein said first reactive functional group and said second reactive functional group are in adjacent layers.

7. The capacitor of claim 6 wherein one adjacent layer of said adjacent layers is said anode conductive polymer layer.

8. The capacitor of claim 6 wherein one adjacent layer of said adjacent layers is said separator conductive polymer layer.

9. The capacitor of claim 6 wherein said cathode comprises a cathode conductive layer and one adjacent layer of said adjacent layers is said cathode conductive polymer layer.

10. The capacitor of claim 2 wherein at least one reactional functional group of said reactive functional groups is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

11. The capacitor of claim 10 wherein said reactive group is selected from the group consisting of epoxy, hydroxyl, amino, carboxylic, urethane, phosphate, silane, isocyanate, cyanate, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

12. The capacitor of claim 1 wherein said liquid electrolyte is between said anode conductive polymer layer and said cathode.

13. The capacitor of claim 12 comprising up to 50 wt % of said liquid electrolyte.

14. The capacitor of claim 1 wherein said anode conductive polymer layer covers at least 80% of a surface area of said first dielectric or at least 80% of a surface area of said cathode comprises a cathode conductive polymer layer.

15. The capacitor of claim 14 wherein said anode conductive polymer layer covers at least 90% of said surface area of said first dielectric or said cathode conductive polymer layer covers at least 90% of said surface area of said cathode.

16. The capacitor of claim 1 comprising multiple anode leads or multiple cathode leads.

17. The capacitor of claim 1 wherein at least one of said anode or said cathode comprises a valve metal.

18. The capacitor of claim 17 wherein said valve metal is selected from the group consisting of tantalum, aluminum, niobium, titanium, zirconium, hafnium, alloys of these elements and a conductive oxide thereof.

19. The capacitor of claim 18 wherein said valve metal is aluminum.

20. The capacitor of claim 1 wherein at least one of said anode, said cathode or said separator has a conductive polymer coating of at least 0.1 mg/cm² to no more than 10 mg/cm².

21. The capacitor of claim 1 having a rated voltage of at least 15 volts to no more than 250 volts.

22. The capacitor of claim 1 wherein adjacent conductive polymer layers are in physical contact.

23. The capacitor of claim 1 wherein at least one of said anode conductive polymer layer, said separator conductive polymer layer or a cathode conductive layer on said cathode is crosslinked with a crosslinker selected from the group consisting of silanes, epoxides, ethers, epoxy crosslinkers and hydrophilic coupling agents.

24. The capacitor of claim 23 wherein said silanes are selected from the group consisting of glycidyl silane and organofunctional silane.

25. The capacitor of claim 24 wherein said organofunctional silane is defined by the formula:

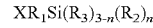

or

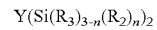

wherein X is an organic functional group;
Y is any organic moiety comprising reactive or nonreactive functional groups;
$R_1$ is an aryl or alkyl $(CH_2)_m$ wherein m is 0 to 14;
$R_2$ is individually a hydrolysable functional group;
$R_3$ is individually an alkyl functional group of 1-6 carbons; and
n is 1 to 3.

26. The capacitor of claim 25 wherein said X is selected from the group consisting of amino, epoxy, anhydride, hydroxy, mercapto, sulfonate, carboxylate, phosphonate, halogen, vinyl, methacryloxy, ester and alkyl.

27. The capacitor of claim 24 wherein said organofunctional silane is selected from the group consisting of 3-glycidoxypropyltrimethoxysilane, 3-aminopropyltriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane and bis(triethoxysilyl)octane.

28. The capacitor of claim 24 wherein said organofunctional silane is defined by the formula:

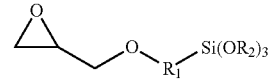

wherein $R_1$ is an alkyl of 1 to 14; and each $R_2$ is independently an alkyl or substituted alkyl of 1 to 6 carbons.

29. The capacitor of claim 24 wherein said organofunctional silane is defined by the formula:

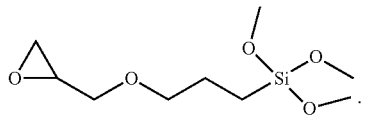

30. The capacitor of claim 23 wherein said epoxy crosslinker is defined by the formula:

wherein the X is an alkyl or substituted alkyl of 0-14 carbons, an aryl or substituted aryl, an ethylene ether or substituted ethylene ether, polyethylene ether or substituted polyethylene ether with 2-20 ethylene ether groups.

31. The capacitor of claim 23 wherein said epoxy crosslinker is selected from the group consisting of ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl etherglycerol polyglycidyl ethers, diglycerol polyglycidyl ethers, trimethylolpropane polyglycidyl ethers, sorbitol diglycidyl ether, sorbitol polyglycidyl ethers, polyethylene glycol diglycidyl ether, polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether or maleimide-epoxy compounds.

32. The capacitor of claim 23 wherein said ethers are glycidyl ether.

33. The capacitor of claim 23 wherein said ethers are defined by the formula:

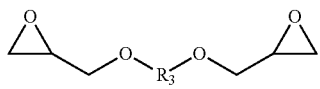

wherein $R_3$ is an alkyl or substituted alkyl of 1-14 carbons, an ethylene ether, polyethylene ether with 2-20 ethylene ether groups; a alkyl substituted with a group selected from hydroxy,

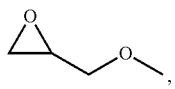

or

—$(CH_2OH)_xCH_2OH$ wherein X is 1 to 14.

34. The capacitor of claim 23 wherein said ether is selected from the group consisting of:

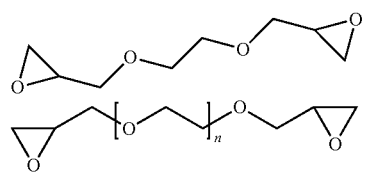

where n is an integer of 1 to 220;

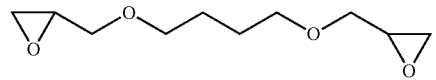

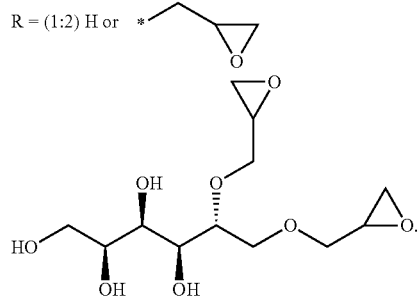

35. A method for forming a capacitor comprising:
    forming a working element comprising:
    forming an anode comprising a first dielectric and an anode conductive polymer layer on said first dielectric;
    forming a cathode;
    forming a separator wherein said separator comprises a separator conductive polymer layer;
    forming a layered structure comprising said anode, said cathode and said separator wherein said separator is between said anode and said cathode;
    forming a winding of said layered structure;
    impregnating said winding with a liquid electrolyte; and
    wherein at least one of said anode conductive polymer layer or said separator conductive polymer layer is crosslinked.

36. The method for forming a capacitor of claim 35 wherein at least one of said anode conductive polymer layer or said separator conductive polymer layer is crosslinked prior to said forming of said winding.

37. The method for forming a capacitor of claim 35 wherein at least one of said anode, said separator or said cathode further comprises reactive functional groups.

38. The method for forming a capacitor of claim 37 wherein said separator comprises a reactive functional group of said reactive functional groups and said reactive functional group is reacted with a second reactive functional group of said reactive functional groups in said separator conductive polymer layer.

39. The method for forming a capacitor of claim 37 wherein a first reactive functional group of said reactive functional groups is crosslinked with a second reactive functional group of said reactive functional groups.

40. The method for forming a capacitor of claim 39 wherein said first reactive functional group and said second reactive functional group are in a common layer.

41. The method for forming a capacitor of claim 39 wherein said first reactive functional group and said second reactive functional group are in adjacent layers.

42. The method for forming a capacitor of claim 41 wherein one adjacent layer of said adjacent layers is said anode conductive polymer layer.

43. The method for forming a capacitor of claim 41 wherein one adjacent layer of said adjacent layers is said separator conductive polymer layer.

44. The method for forming a capacitor of claim 41 wherein said cathode comprises a cathode conductive layer and one adjacent layer of said adjacent layers is said cathode conductive polymer layer.

45. The method for forming a capacitor of claim 37 wherein at least one reactional functional group of said reactive functional groups is selected from the group consisting of epoxy, hydroxyl, amino, carboxylic, urethane, phosphate, silane, isocyanate, cyanate, nitro, peroxy, phosphio, phosphono, sulfonic acid, sulfone, nitro, acrylate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

46. The method for forming a capacitor of claim 45 wherein said reactive group is selected from the group consisting of epoxy, hydroxyl, amino, carboxylic, urethane, phosphate, silane, isocyanate, cyanate, imide, amide, carboxyl, carboxylic anhydride, silane, oxazoline, (meth)acrylates, vinyls, maleates and maleimides itaconates, allyl alcohol esters, dicyclo-pentadiene-based unsaturations, unsaturated $C_{12}$-$C_{22}$ fatty esters or amides, carboxylic acid salts and quaternary ammonium salts.

47. The method for forming a capacitor of claim 35 wherein said liquid electrolyte is between said anode conductive polymer layer and said cathode.

48. The method for forming a capacitor of claim 47 comprising up to 50 wt % of said liquid electrolyte.

49. The method for forming a capacitor of claim 35 wherein said anode conductive polymer layer covers at least 80% of a surface area of said first dielectric or at least 80% of a surface area of said cathode comprises a cathode conductive polymer layer.

50. The method for forming a capacitor of claim 49 wherein said anode conductive polymer layer covers at least 90% of said surface area of said first dielectric or said cathode conductive polymer layer covers at least 90% of said surface area of said cathode.

51. The method for forming a capacitor of claim 35 comprising multiple anode leads or multiple cathode leads.

52. The method for forming a capacitor of claim 35 wherein at least one of said anode or said cathode comprises a valve metal.

53. The method for forming a capacitor of claim 52 wherein said valve metal is selected from the group consisting of tantalum, aluminum, niobium, titanium, zirconium, hafnium, alloys of these elements and a conductive oxide thereof.

54. The method for forming a capacitor of claim 53 wherein said valve metal is aluminum.

55. The method for forming a capacitor of claim 35 wherein at least one of said anode, said cathode or said separator has a conductive polymer coating of at least 0.1 mg/cm² to no more than 10 mg/cm².

56. The method for forming a capacitor of claim 35 having a rated voltage of at least 15 volts to no more than 250 volts.

57. The method for forming a capacitor of claim 35 wherein adjacent conductive polymer layers are in physical contact.

58. The method for forming a capacitor of claim 35 wherein at least one of said anode conductive polymer layer, said separator conductive polymer layer or a cathode conductive layer on said cathode is crosslinked with a crosslinker selected from the group consisting of silanes, epoxides, ethers, epoxy crosslinkers and hydrophilic coupling agents.

59. The method for forming a capacitor of claim 58 wherein said silanes are selected from the group consisting of glycidyl silane and organofunctional silane.

60. The method for forming a capacitor of claim 59 wherein said organofunctional silane is defined by the formula:

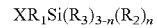

or

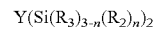

wherein X is an organic functional group;
Y is any organic moiety comprising reactive or nonreactive functional groups;
$R_1$ is an aryl or alkyl $(CH_2)_m$ wherein m is 0 to 14;
$R_2$ is individually a hydrolysable functional group;
$R_3$ is individually an alkyl functional group of 1-6 carbons; and
n is 1 to 3.

61. The method for forming a capacitor of claim 60 wherein said X is selected from the group consisting of amino, epoxy, anhydride, hydroxy, mercapto, sulfonate, carboxylate, phosphonate, halogen, vinyl, methacryloxy, ester and alkyl.

62. The method for forming a capacitor of claim 59 wherein said organofunctional silane is selected from the group consisting of 3-glycidoxypropyltrimethoxysilane, 3-aminopropytriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane and bis(triethoxysilyl)octane.

63. The method for forming a capacitor of claim 59 wherein said organofunctional silane is defined by the formula:

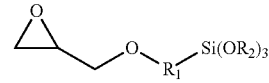

wherein $R_1$ is an alkyl of 1 to 14; and
each $R_2$ is independently an alkyl or substituted alkyl of 1 to 6 carbons.

64. The method for forming a capacitor of claim 59 wherein said organofunctional silane is defined by the formula:

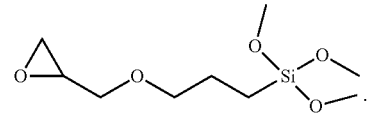

65. The method for forming a capacitor of claim 58 wherein said epoxy crosslinker is defined by the formula:

wherein the X is an alkyl or substituted alkyl of 0-14 carbons, an aryl or substituted aryl, an ethylene ether or substituted ethylene ether, polyethylene ether or substituted polyethylene ether with 2-20 ethylene ether groups.

66. The method for forming a capacitor of claim 58 wherein said epoxy crosslinker is selected from the group consisting of ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl etherglycerol polyglycidyl ethers, diglycerol polyglycidyl ethers, trimethylolpropane polyglycidyl ethers, sorbitol diglycidyl ether, sorbitol polyglycidyl ethers, polyethylene glycol diglycidyl ether, polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether or maleimide-epoxy compounds.

67. The method for forming a capacitor of claim 58 wherein said ethers are glycidyl ether.

68. The method for forming a capacitor of claim 58 wherein said ethers are defined by the formula:

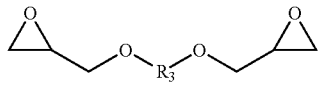

wherein $R_3$ is an alkyl or substituted alkyl of 1-14 carbons, an ethylene ether, polyethylene ether with 2-20 ethylene ether groups; a alkyl substituted with a group selected from hydroxy,

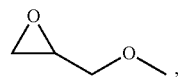

or

—$(CH_2OH)_xCH_2OH$ wherein X is 1 to 14.

69. The method for forming a capacitor of claim 58 wherein said ether is selected from the group consisting of:

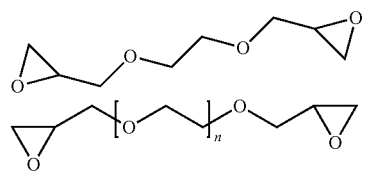

where n is an integer of 1 to 220;

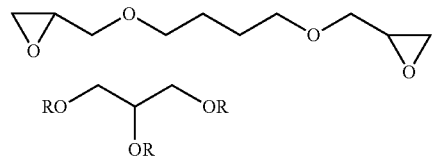

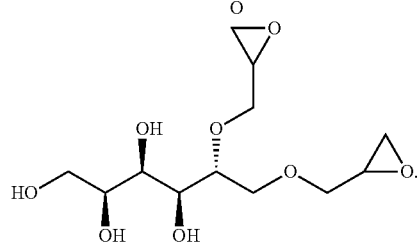

* * * * *